(12) United States Patent
Chiappetta

(10) Patent No.: US 11,378,973 B2
(45) Date of Patent: *Jul. 5, 2022

(54) CELESTIAL NAVIGATION SYSTEM FOR AN AUTONOMOUS VEHICLE

(71) Applicant: iRobot Corporation, Bedford, MA (US)

(72) Inventor: Mark J. Chiappetta, Chelmsford, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/371,022

(22) Filed: Jul. 8, 2021

(65) Prior Publication Data
US 2021/0333799 A1 Oct. 28, 2021

Related U.S. Application Data

(63) Continuation of application No. 16/827,447, filed on Mar. 23, 2020, which is a continuation of application
(Continued)

(51) Int. Cl.
*G05D 1/02* (2020.01)
*H02J 50/10* (2016.01)
(Continued)

(52) U.S. Cl.
CPC .......... *G05D 1/0246* (2013.01); *A47L 9/2826* (2013.01); *A47L 9/2836* (2013.01);
(Continued)

(58) Field of Classification Search
CPC .......... G05D 1/00; G05D 1/02; G05D 1/0276; G05D 1/0016; G05D 1/0088;
(Continued)

(56) References Cited

U.S. PATENT DOCUMENTS 4,328,545 A 5/1982 Halsall et al.
4,482,960 A 11/1984 Pryor
(Continued)

OTHER PUBLICATIONS

*SharkNinja Operating LLC, SharkNinja Management LLC, and SharkNinja Sales Company*, Petitioners, v. *iRobot Corporation*, Patent Owner, Case PGR2021-00079, U.S. Pat. No. 10,990,110, Patent Owner's Preliminary Response, dated Aug. 16, 2021, 24 pages.
(Continued)

*Primary Examiner* — Bhavesh V Amin
(74) *Attorney, Agent, or Firm* — Fish & Richardson P.C.

(57) ABSTRACT

A navigation control system for an autonomous vehicle comprises a transmitter and an autonomous vehicle. The transmitter comprises an emitter for emitting at least one signal, a power source for powering the emitter, a device for capturing wireless energy to charge the power source, and a printed circuit board for converting the captured wireless energy to a form for charging the power source. The autonomous vehicle operates within a working area and comprises a receiver for detecting the at least one signal emitted by the emitter, and a processor for determining a relative location of the autonomous vehicle within the working area based on the signal emitted by the emitter.

30 Claims, 24 Drawing Sheets

Related U.S. Application Data

No. 15/491,603, filed on Apr. 19, 2017, now Pat. No. 10,599,159, which is a continuation of application No. 15/366,367, filed on Dec. 1, 2016, now Pat. No. 9,921,586, which is a continuation of application No. 14/966,621, filed on Dec. 11, 2015, now Pat. No. 9,529,363, which is a continuation of application No. 13/731,393, filed on Dec. 31, 2012, now Pat. No. 9,223,749, which is a continuation of application No. 12/611,814, filed on Nov. 3, 2009, now Pat. No. 8,972,052.

(51) Int. Cl.
| | |
|---|---|
| *B60L 53/38* | (2019.01) |
| *A47L 9/28* | (2006.01) |
| *G01C 21/20* | (2006.01) |
| *G01S 5/02* | (2010.01) |
| *G05D 1/00* | (2006.01) |
| *G06F 17/00* | (2019.01) |
| *H02J 7/02* | (2016.01) |
| *H04W 88/06* | (2009.01) |

(52) U.S. Cl.
CPC ............ *A47L 9/2894* (2013.01); *B60L 53/38* (2019.02); *G01C 21/20* (2013.01); *G01C 21/206* (2013.01); *G01S 5/0284* (2013.01); *G05D 1/0016* (2013.01); *G05D 1/0088* (2013.01); *G05D 1/0219* (2013.01); *G05D 1/0225* (2013.01); *G05D 1/0234* (2013.01); *G05D 1/0242* (2013.01); *G05D 1/0276* (2013.01); *G06F 17/00* (2013.01); *H02J 7/025* (2013.01); *H02J 50/10* (2016.02); *A47L 2201/022* (2013.01); *A47L 2201/04* (2013.01); *A47L 2201/06* (2013.01); *G05D 1/0227* (2013.01); *G05D 1/0238* (2013.01); *G05D 1/0274* (2013.01); *G05D 2201/0203* (2013.01); *G05D 2201/0215* (2013.01); *H04W 88/06* (2013.01); *Y10S 901/01* (2013.01)

(58) Field of Classification Search
CPC .. G05D 1/0219; G05D 1/0225; G05D 1/0242; G05D 1/0246; G05D 2201/0203; A47L 9/28; A47L 9/04; A47L 11/40; A47L 9/00; A47L 5/22; A47L 9/14; A47L 9/2826; A47L 9/2836; A47L 9/2894; A47L 2201/022; A47L 2201/04; A47L 2201/06; B25J 9/00; B25J 13/00; B25J 5/00; B25J 9/16; G05B 19/4155; H04L 12/28; B64C 39/00; B64C 39/02; B64D 1/22; D06F 29/00; G01N 33/00; G06F 3/0481; G06F 3/0482; G06F 3/0484; G06F 17/00; H04W 4/00; H04W 88/06; G06T 7/73; B60L 53/38; G01C 21/20; G01C 21/206; G01S 5/0284; H02J 7/025; H02J 50/10; Y10S 901/01

See application file for complete search history.

(56) References Cited

U.S. PATENT DOCUMENTS

| | | | |
|---|---|---|---|
| 4,638,445 A | 1/1987 | Mattaboni | |
| 4,638,446 A | 1/1987 | Palmberg | |
| 4,679,152 A | 7/1987 | Perdue | |
| 4,691,101 A | 9/1987 | Leonard | |
| 4,790,402 A | 12/1988 | Field | |
| 4,817,000 A | 3/1989 | Eberhardt | |
| 4,933,864 A | 6/1990 | Evans et al. | |
| 4,947,094 A | 8/1990 | Dyer | |
| 4,954,962 A | 9/1990 | Evans et al. | |
| 4,962,453 A | 10/1990 | Pong et al. | |
| 5,001,635 A | 3/1991 | Yasutomi et al. | |
| 5,023,788 A | 6/1991 | Kitazume et al. | |
| 5,032,775 A | 7/1991 | Mizuno et al. | |
| 5,051,906 A | 9/1991 | Evans et al. | |
| 5,086,535 A | 2/1992 | Grossmeyer et al. | |
| 5,165,064 A | 11/1992 | Mattaboni | |
| 5,170,352 A | 12/1992 | McTamaney et al. | |
| 5,204,814 A | 4/1993 | Noonan et al. | |
| 5,220,263 A | 6/1993 | Onishi et al. | |
| 5,307,271 A | 4/1994 | Everett et al. | |
| 5,321,614 A | 6/1994 | Ashworth | |
| 5,341,540 A | 8/1994 | Soupert et al. | |
| 5,410,479 A | 4/1995 | Coker | |
| 5,453,931 A | 9/1995 | Watts, Jr. | |
| 5,525,883 A | 6/1996 | Avitzour | |
| 5,528,888 A | 6/1996 | Miyamoto et al. | |
| 5,634,237 A | 6/1997 | Paranjpe | |
| 5,659,779 A | 8/1997 | Laird | |
| 5,677,836 A | 10/1997 | Bauer | |
| 5,696,675 A | 12/1997 | Nakamura et al. | |
| 5,770,936 A | 6/1998 | Hirai et al. | |
| 5,841,259 A | 11/1998 | Kim et al. | |
| 5,926,909 A | 7/1999 | McGee | |
| 5,940,930 A | 8/1999 | Oh et al. | |
| 5,942,869 A | 8/1999 | Katou et al. | |
| 5,995,884 A * | 11/1999 | Allen | G05D 1/0234 |
| | | | 701/25 |
| 5,998,953 A | 12/1999 | Nakamura et al. | |
| 6,009,359 A | 12/1999 | El-Hakim et al. | |
| 6,076,025 A | 6/2000 | Ueno et al. | |
| 6,076,226 A | 6/2000 | Reed | |
| 6,142,252 A | 11/2000 | Kinto et al. | |
| 6,292,712 B1 | 9/2001 | Bullen | |
| 6,336,051 B1 | 1/2002 | Pangels et al. | |
| 6,339,735 B1 | 1/2002 | Peless et al. | |
| 6,370,452 B1 | 4/2002 | Pfister | |
| 6,370,453 B2 | 4/2002 | Sommer | |
| 6,374,155 B1 | 4/2002 | Wallach et al. | |
| 6,389,329 B1 | 5/2002 | Colens | |
| 6,457,206 B1 * | 10/2002 | Judson | A47L 11/4075 |
| | | | 15/340.1 |
| 6,459,955 B1 | 10/2002 | Bartsch et al. | |
| 6,493,612 B1 | 12/2002 | Bisset et al. | |
| 6,496,754 B2 | 12/2002 | Song et al. | |
| 6,496,755 B2 | 12/2002 | Wallach et al. | |
| 6,532,404 B2 | 3/2003 | Colens | |
| 6,574,536 B1 | 6/2003 | Kawagoe et al. | |
| 6,594,844 B2 | 7/2003 | Jones | |
| 6,597,076 B2 | 7/2003 | Scheible et al. | |
| 6,615,108 B1 | 9/2003 | Peless et al. | |
| 6,658,325 B2 | 12/2003 | Zweig | |
| 6,690,134 B1 | 2/2004 | Jones et al. | |
| 6,732,826 B2 | 5/2004 | Song et al. | |
| 6,781,338 B2 | 8/2004 | Jones et al. | |
| 6,809,490 B2 | 10/2004 | Jones et al. | |
| 6,830,120 B1 | 12/2004 | Yashima et al. | |
| 6,836,701 B2 * | 12/2004 | McKee | G05D 1/0297 |
| | | | 701/25 |
| 6,845,297 B2 | 1/2005 | Allard | |
| 6,865,447 B2 * | 3/2005 | Lau | G06N 3/008 |
| | | | 700/258 |
| 6,868,307 B2 | 3/2005 | Song | |
| 6,965,209 B2 | 11/2005 | Jones et al. | |
| 7,024,280 B2 * | 4/2006 | Parker | G06N 3/008 |
| | | | 901/50 |
| 7,041,029 B2 | 5/2006 | Fulghum et al. | |
| 7,042,342 B2 | 5/2006 | Luo | |
| 7,054,716 B2 | 5/2006 | McKee et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,332,890 B2 | 2/2008 | Cohen et al. | |
| 7,349,091 B2 | 3/2008 | Wada et al. | |
| 7,388,343 B2 | 6/2008 | Jones et al. | |
| 7,388,879 B2 | 6/2008 | Sabe et al. | |
| 7,389,156 B2 | 6/2008 | Ziegler et al. | |
| 7,448,113 B2 | 11/2008 | Jones et al. | |

(56) References Cited

U.S. PATENT DOCUMENTS

| | | | |
|---|---|---|---|
| 7,456,596 B2 | 11/2008 | Goodall | |
| 7,480,958 B2 | 1/2009 | Song | |
| 7,567,052 B2 | 7/2009 | Jones et al. | |
| 7,571,511 B2 | 8/2009 | Jones et al. | |
| 7,579,803 B2 | 8/2009 | Jones et al. | |
| 7,636,982 B2 | 12/2009 | Jones et al. | |
| 7,706,917 B1 | 4/2010 | Chiappetta et al. | |
| 7,739,036 B2 | 6/2010 | Grimm et al. | |
| 7,761,954 B2 | 7/2010 | Ziegler et al. | |
| 7,805,220 B2 | 9/2010 | Taylor et al. | |
| 7,860,680 B2 | 12/2010 | Arms et al. | |
| 8,368,339 B2 | 2/2013 | Jones et al. | |
| 8,380,350 B2 | 2/2013 | Ozick et al. | |
| 8,396,599 B2 | 3/2013 | Matsuo et al. | |
| 8,659,255 B2 | 2/2014 | Jones et al. | |
| 8,659,256 B2 | 2/2014 | Jones et al. | |
| 8,686,679 B2 | 4/2014 | Jones et al. | |
| 8,688,272 B2 | 4/2014 | Hong et al. | |
| 8,718,837 B2* | 5/2014 | Wang | G05D 1/024 382/209 |
| 8,761,931 B2 | 6/2014 | Halloran | |
| 8,843,245 B2* | 9/2014 | Choe | G05D 1/0274 700/214 |
| 8,954,192 B2 | 2/2015 | Ozick et al. | |
| 8,965,579 B2* | 2/2015 | Wang | B25J 11/009 901/1 |
| 8,972,052 B2 | 3/2015 | Chiapetta | |
| 9,008,835 B2* | 4/2015 | Dubrovsky | B25J 13/006 700/264 |
| 9,079,311 B2* | 7/2015 | Wang | B25J 11/0095 |
| 9,144,360 B2 | 9/2015 | Ozick et al. | |
| 9,229,454 B1 | 1/2016 | Chiappetta et al. | |
| 9,233,472 B2 | 1/2016 | Angle | |
| 9,265,396 B1 | 2/2016 | Lu | |
| 9,314,925 B2 | 4/2016 | Hong et al. | |
| 9,349,058 B2 | 5/2016 | Schamp | |
| 9,361,021 B2* | 6/2016 | Jordan | G06Q 10/10 |
| 9,375,847 B2* | 6/2016 | Angle | H04L 12/282 |
| 9,392,920 B2 | 7/2016 | Halloran et al. | |
| 9,446,510 B2 | 9/2016 | Vu | |
| 9,486,924 B2 | 11/2016 | Dubrovsky | |
| 9,529,363 B2 | 12/2016 | Chiapetta | |
| 9,582,005 B2 | 2/2017 | Jones et al. | |
| 9,629,514 B2 | 4/2017 | Hillen et al. | |
| 9,675,226 B2* | 6/2017 | Kim | A47L 11/4061 |
| 9,717,387 B1 | 8/2017 | Szatmary | |
| 9,802,322 B2 | 10/2017 | Angle | |
| 9,828,094 B2* | 11/2017 | McMillion | G05D 1/0094 |
| 9,874,873 B2* | 1/2018 | Angle | G05D 1/0022 |
| 9,921,586 B2* | 3/2018 | Chiappetta | H02J 50/10 |
| 9,958,871 B2 | 5/2018 | Jones et al. | |
| 10,168,709 B2* | 1/2019 | Kleiner | A47L 9/0488 |
| 10,310,507 B2* | 6/2019 | Kleiner | G05D 1/0016 |
| 10,365,659 B2* | 7/2019 | Park | B25J 9/16 |
| 10,399,223 B2* | 9/2019 | Wang | B25J 11/009 |
| 10,599,159 B2 | 3/2020 | Chiappetta | |
| 10,824,165 B2 | 11/2020 | Jones et al. | |
| 10,835,096 B2* | 11/2020 | O'Dea | G01C 21/383 |
| 10,990,110 B2 | 4/2021 | Chiappetta et al. | |
| 11,006,802 B2* | 5/2021 | Watanabe | A47L 9/2894 |
| 11,209,833 B2 | 12/2021 | Chiappetta | |
| 2001/0004719 A1 | 6/2001 | Sommer | |
| 2002/0016649 A1 | 2/2002 | Jones | |
| 2002/0060542 A1 | 5/2002 | Song et al. | |
| 2002/0120364 A1 | 8/2002 | Colens | |
| 2002/0153184 A1* | 10/2002 | Song | G05D 1/0282 180/167 |
| 2003/0023356 A1 | 1/2003 | Keable | |
| 2003/0025472 A1 | 2/2003 | Jones et al. | |
| 2003/0030398 A1* | 2/2003 | Jacobs | G05D 1/0225 318/568.12 |
| 2003/0030399 A1* | 2/2003 | Jacobs | G05D 1/0274 318/568.16 |
| 2003/0090522 A1 | 5/2003 | Verhaar | |
| 2003/0120389 A1 | 6/2003 | Abramson et al. | |
| 2003/0179223 A1* | 9/2003 | Ying | G06F 3/0488 715/702 |
| 2003/0212472 A1 | 11/2003 | McKee | |
| 2004/0020000 A1 | 2/2004 | Jones | |
| 2004/0049877 A1 | 3/2004 | Jones et al. | |
| 2004/0073337 A1* | 4/2004 | McKee | G05D 1/0274 700/245 |
| 2004/0083570 A1 | 5/2004 | Song et al. | |
| 2004/0085037 A1 | 5/2004 | Jones et al. | |
| 2004/0113777 A1 | 6/2004 | Matsuhira et al. | |
| 2004/0187457 A1 | 9/2004 | Colens | |
| 2004/0201361 A1 | 10/2004 | Koh et al. | |
| 2004/0204792 A1 | 10/2004 | Taylor et al. | |
| 2004/0207355 A1 | 10/2004 | Jones et al. | |
| 2004/0211444 A1 | 10/2004 | Taylor et al. | |
| 2004/0220707 A1 | 11/2004 | Pallister | |
| 2004/0236468 A1 | 11/2004 | Taylor et al. | |
| 2005/0000543 A1 | 1/2005 | Taylor et al. | |
| 2005/0067994 A1 | 3/2005 | Jones et al. | |
| 2005/0171636 A1* | 8/2005 | Tani | G05D 1/0276 701/23 |
| 2005/0204505 A1 | 9/2005 | Kashiwagi | |
| 2005/0204717 A1 | 9/2005 | Colens | |
| 2005/0270530 A1 | 12/2005 | Wada et al. | |
| 2005/0287038 A1* | 12/2005 | Dubrovsky | B25J 13/006 422/63 |
| 2006/0038521 A1 | 2/2006 | Jones et al. | |
| 2006/0095158 A1* | 5/2006 | Lee | H04M 1/72415 318/568.12 |
| 2006/0220900 A1 | 10/2006 | Ceskutti et al. | |
| 2006/0288519 A1 | 12/2006 | Jaworski et al. | |
| 2006/0293788 A1 | 12/2006 | Pogodin | |
| 2007/0100548 A1 | 5/2007 | Small | |
| 2007/0250212 A1 | 10/2007 | Halloran et al. | |
| 2007/0266508 A1 | 11/2007 | Jones et al. | |
| 2007/0271011 A1 | 11/2007 | Lee | |
| 2007/0290649 A1 | 12/2007 | Jones et al. | |
| 2008/0007203 A1 | 1/2008 | Cohen et al. | |
| 2008/0039974 A1 | 2/2008 | Sandin et al. | |
| 2008/0051263 A1 | 2/2008 | Jones et al. | |
| 2008/0058987 A1 | 3/2008 | Ozick et al. | |
| 2008/0084174 A1 | 4/2008 | Jones et al. | |
| 2008/0091304 A1 | 4/2008 | Ozick et al. | |
| 2008/0109126 A1 | 5/2008 | Sandin et al. | |
| 2008/0140255 A1 | 6/2008 | Ziegler et al. | |
| 2008/0155768 A1 | 7/2008 | Ziegler et al. | |
| 2008/0263477 A1* | 10/2008 | Ying | G06F 3/04886 715/810 |
| 2008/0266748 A1 | 10/2008 | Lee | |
| 2008/0307590 A1 | 12/2008 | Jones et al. | |
| 2009/0102296 A1 | 4/2009 | Greene et al. | |
| 2009/0182464 A1* | 7/2009 | Myeong | G05D 1/0274 701/25 |
| 2009/0319083 A1 | 12/2009 | Jones et al. | |
| 2010/0049365 A1 | 2/2010 | Jones et al. | |
| 2010/0082193 A1* | 4/2010 | Chiappetta | A47L 9/2894 455/127.1 |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2010/0268384 A1 | 10/2010 | Jones et al. | |
| 2010/0292839 A1 | 11/2010 | Hong et al. | |
| 2010/0312429 A1 | 12/2010 | Jones et al. | |
| 2011/0004339 A1 | 1/2011 | Ozick et al. | |
| 2011/0077802 A1 | 3/2011 | Halloran | |
| 2011/0202175 A1 | 8/2011 | Romanov | |
| 2011/0264305 A1* | 10/2011 | Choe | G05D 1/0246 701/28 |
| 2012/0168240 A1 | 7/2012 | Wilson | |
| 2012/0197439 A1* | 8/2012 | Wang | G06F 3/0482 901/1 |
| 2012/0197464 A1* | 8/2012 | Wang | G05D 1/0038 701/28 |
| 2012/0259481 A1 | 10/2012 | Kim | |
| 2012/0262284 A1 | 10/2012 | Irrgang et al. | |
| 2012/0265391 A1* | 10/2012 | Letsky | G05D 1/0221 701/25 |

(56) References Cited

U.S. PATENT DOCUMENTS

| | | | |
|---|---|---|---|
| 2013/0103194 A1 | 4/2013 | Jones et al. | |
| 2014/0116469 A1* | 5/2014 | Kim | A47L 9/2894 15/319 |
| 2014/0156071 A1 | 6/2014 | Hong et al. | |
| 2014/0166047 A1 | 6/2014 | Hillen et al. | |
| 2014/0207281 A1* | 7/2014 | Angle | H04L 12/282 700/257 |
| 2014/0207282 A1* | 7/2014 | Angle | G06Q 10/1095 901/1 |
| 2014/0222251 A1 | 8/2014 | Jones et al. | |
| 2014/0316636 A1 | 10/2014 | Hong | |
| 2015/0077502 A1* | 3/2015 | Jordan | G16H 40/67 348/14.03 |
| 2015/0314449 A1* | 11/2015 | Wang | B25J 5/00 901/1 |
| 2016/0010574 A1 | 1/2016 | Kumar et al. | |
| 2016/0282863 A1* | 9/2016 | Angle | H04L 12/282 |
| 2017/0023944 A1* | 1/2017 | Wang | B25J 9/1689 |
| 2017/0097641 A1 | 4/2017 | Jones et al. | |
| 2017/0123433 A1 | 5/2017 | Chiappetta | |
| 2017/0265703 A1* | 9/2017 | Park | G05D 1/0044 |
| 2018/0074508 A1* | 3/2018 | Kleiner | A47L 9/2857 |
| 2018/0257688 A1 | 9/2018 | Carter et al. | |
| 2018/0284786 A1 | 10/2018 | Moshkina-Martinson et al. | |
| 2018/0284792 A1* | 10/2018 | Kleiner | A47L 9/2852 |
| 2018/0292828 A1 | 10/2018 | Jones et al. | |
| 2018/0329617 A1* | 11/2018 | Jones | G06F 3/04847 |
| 2019/0150686 A1 | 5/2019 | Horne et al. | |
| 2020/0218282 A1 | 7/2020 | Chiappetta | |
| 2020/0233434 A1 | 7/2020 | Chiappetta | |
| 2021/0011485 A1 | 1/2021 | Chiappetta | |
| 2021/0089040 A1 | 3/2021 | Afrouzi et al. | |
| 2021/0294348 A1 | 9/2021 | Lan et al. | |
| 2021/0333800 A1 | 10/2021 | Chiappetta et al. | |
| 2021/0341942 A1 | 11/2021 | Chiappetta | |
| 2021/0341943 A1 | 11/2021 | Chiappetta | |

OTHER PUBLICATIONS

*SharkNinja Operating LLC, SharkNinja Management LLC, and SharkNinja Sales Company*, Petitioners, v. *iRobot Corporation*, Patent Owner, IPRP2020-00734, U.S. Pat. No. 9,921,586, Record of Oral Hearing held on Jul. 12, 2021, entered in Jul. 28, 2021, 42 pages.
"Facts on the Trilobite," Electrolux, accessed online <http://trilobite.electrolux.se/presskit_en/node1335.asp?print=yes&pressID=> Dec. 12, 2003, 2 pages.
[No Author Listed], "Patent Owner's Oral Hearing Demonstratives," *SharkNinja Operating LLC, SharkNinja Management LLC, and SharkNinja Sales Co.* (Petitioners) v. *iRobot Corp.* (Patent Owner), Case No. IPR2020-00734, U.S. Pat. No. 9,921,586, Before Hon. Terrence W. McMillin, Amanda F. Wieker, and Jason W. Melvin, Filed Jul 7, 2021, 31 pages.
[No Author Listed], "Petitioner's Demonstratives," *SharkNinja Operating LLC et al.* v. *iRobot Corp.*, IPR2020-00734, U.S. Pat. No. 9,921,586, Jul 12, 2021, 32 pages.
Certified English Translation of DE Patent No. 10113105, issued on Oct. 4, 2001, Koechel et al. (Exhibit No. 1008 in IPR2020-00734).
Certified English Translation of JP H07281752, issued on Oct. 27, 1995, Hamaguchi et al. (Exhibit No. 1010 in IPR2020-00734).
Certified English Translation of JP Patent No. 2002-85305, issued on Mar. 26, 2002, Murakami (Exhibit No. 1005 in IPR2020-00734).
Curriculum Vitae of Alonzo J. Kelly, (undated), 44 pages (Exhibit No. 1003 in IPR2020-00734).
Curriculum Vitae of Noah Cowan, Ph.D., dated Apr. 25, 2021, 21 pages (Exhibit 1004, PGR2021-00079), 21 pages.
DE Patent No. 10113105, published on Oct. 4, 2001, Koechel et al. (Exhibit No. 1007 in IPR2020-00734)(with English Abstract).
Doty et al., "Sweep Strategies for a Sensory-Driven, Behavior-Based Vacuum Cleaning Agent," AAAI 1993 Fall S muosium Series, Instantiating Real-World Aents, pp. 1-6, Oct. 22-24, 1993.

Electrolux "Welcome to the Electrolux trilobite" www.electroluxusa.com/node57.asp?currentURL=node142.asp%3F, 2 pages, Mar. 18, 2005.
Everett, H.R. (1995). Sensors for Mobile Robots. AK Peters, Ltd., Wellesley, MA., 543 pages.
File History for U.S. Appl. No. 15/366,367, filed Dec. 1, 2016, 216 pages (Exhibit No. 1013 in IPR2020-00734).
Hitachi: News release: "The home cleaning robot of the autonomous movement type (experimental machine)," Retrieved from the Internet: URL<www.i4u.com/japanreleases/hitachirobot.htm>. 5 pages, Mar. 2005.
Honda Motor Co., Ltd., English Translation of JP11212642, Aug. 9, 1999, 31 pages.
*IRobot Corporation* v. *SharkNinja Operating LLC, SharkNinja Management LLC, and SharkNinja Sales Company*, "Complaint for Patent Infringement," Civil Action No. DMA-1-19-cv-12125-1, dated Oct. 15, 2019, 20 pages (IPR2020-00734, Exhibit No. 2012).
*IRobot Corporation* v. *SharkNinja Operating LLC, SharkNinja Management LLC, and SharkNinja Sales Company*, "Patent Owner's Preliminary Sur-Reply," Case No. IPR2020-00734, U.S. Pat. No. 9,921,586, filed Aug. 14, 2020, 9 pages.
*IRobot Corporation* v. *SharkNinja Operating LLC, SharkNinja Management LLC, and SharkNinja Sales Company*, "Transcript of Hearing Before the Honorable Allison D. Burroughs," Civil Action No. 19-cv-12125-ADB, dated Oct. 25, 2019, 33 pages (IPR2020-00734, Exhibit No. 2008).
Jones, J., Roth, D. (Jan. 2, 2004). Robot Programming: A Practical Guide to Behavior-Based Robotics. McGraw-Hill Education TAB; 288 pages.
JP Patent No. 2002-85305, issued on Mar. 26, 2002, Murakami (Exhibit No. 1004 in IPR2020-00734) (with English Abstract).
JP Patent No. H07281752, issued on Oct. 27, 1995, Hamaguchi et al. (Exhibit No. 1009 in IPR2020-00734) (with English Abstract).
Karcher "Karcher RoboCleaner RC 3000," Retrieved from the Internet: URL<www.robocleaner.de/english/screen3.html>. 4 pages, Dec. 2003.
Karcher USA, RC3000 Robotic Cleaner, website: http://www.karcher-usa.com/showproducts.php?op=viewprod&param1=143&param2=&param3=, 3 pages, accessed Mar. 2005.
Karcher, "Product Manual Download Karch", available at www.karcher.com, 16 pages, 2004.
Kurs et al., "Wireless Power Transfer via Strongly Coupled Magnetic Resonances," Science, Jul. 6, 2007, 317:83-86 (Exhibit 1024, PGR2021-00079), 5 pages.
Nam et al., "Real-Time Dynamic Visual Tracking Using PSD Sensors and extended Trapezoidal Motion Planning", Applied Intelligence 10, pp. 53-70, 1999.
Popec.net Make your digital life http://www.popco.net/zboard/view.php?id=tr_review&no=40 accessed Nov. 1, 2011.
Prassler et al., "A Short History of Cleaning Robots," Autonomous Robots 9, 211-226, 2000, 16 pages.
U.S. Appl. No. 60/586,046, "Celestial Navigation System for an Autonomous Robot," filed Jul. 7, 2004, Chiappetta, (Exhibit 1025, PGR2021-00079), 26 pages.
*SharkNinja Operating LLC, SharkNinja Management LLC, and SharkNinja Management LLC, and SharNinja Sales Company*, Petitioners, v. *iRobot Corporation*, Patent Owner, Case PGR2021-00079, U.S. Pat. No. 10,9990,110, Petitioners' Power of Attorney, Filed Apr. 28, 2021, 3 pages.
*SharkNinja Operating LLC, SharkNinja Management LLC, and SharkNinja Sales Company* v. *iRobot Corporation*, "Declaration of Timothy Johnston," Case No. IPR2020-00734, U.S. Pat. No. 9,921,586, filed Aug. 7, 2020, 4 pages (Exhibit No. 1025).
*SharkNinja Operating LLC, SharkNinja Management LLC, and SharkNinja Sales Company* v. *iRobot Corporation*, "Patent Owner's Preliminary Response," Case No. IPR2020-00734, U.S. Pat. No. 9,921,586, filed Jul. 7, 2020, 45 pages.
*SharkNinja Operating LLC, SharkNinja Management LLC, and SharkNinja Sales Company* v. *iRobot Corporation*, "Petitioners' Reply to Patent Owner Preliminary Response," Case No. IPR2020-00734, U.S. Pat. No. 9,921,586, filed Aug. 7, 2020, 9 pages.
*SharkNinja Operating LLC, SharkNinja Management LLC, and SharkNinja Sales Company* v. *iRobot Corporation*, "Petitioners'

(56) References Cited

OTHER PUBLICATIONS

Updated Exhibit List," Case No. IPR2020-00734, U.S. Pat. No. 9,921,586, filed Aug. 7, 2020, 3 pages.
*SharkNinja Operating LLC, SharkNinja Management LLC, and SharkNinja Sales Company* v. *iRobot Corporation*, Declaration of Dr. Alonzo Kelly of U.S. Pat. No. 9,921,586, dated Mar. 23, 2020, 107 pages (Exhibit No. 1002 in IPR2020-00734).
*SharkNinja Operating LLC, SharkNinja Management LLC, and SharkNinja Sales Company* v. *iRobot Corporation*, Petitioners' Power of Attorney in Case No. IPR2020-00734 for U.S. Pat. No. 9,921,586, dated Mar. 18, 2020, 2 pages.
*SharkNinja Operating LLC, SharkNinja Management LLC, and SharkNinja Sales Company* v. *iRobot Corporation*, Petition for Inter Partes Review of U.S. Pat. No. 9,921,586, Case No. IPR2020-00734, dated Mar. 23, 2020, 83 pages.
*SharkNinja Operating LLC, SharkNinja Management LLC, and SharkNinja Sales Company*, Petitioners, v. *iRobot Corporation*, Patent Owner, Case IPR2020-00734, U.S. Pat. No. 9,921,586, Patent Owner's Exhibit List, filed Jul. 7, 2021, 4 pages.
*SharkNinja Operating LLC, SharkNinja Management LLC, and SharkNinja Sales Company*, Petitioners, v. *iRobot Corporation*, Patent Owner, Case IPR2020-00734, U.S. Pat. No. 9,921,586, Patent Owner's Sur-Reply, dated Jun. 4, 2021, 33 pages.
*SharkNinja Operating LLC, SharkNinja Management LLC, and SharkNinja Sales Company*, Petitioners, v. *iRobot Corporation*, Patent Owner, Case IPR2020-00734, U.S. Pat. No. 9,921,586, Petitioners' Reply in Support of Petition for Inter Partes Review of U.S. Pat. No. 9,921,586, filed Apr. 23, 2021, 28 pages (IPR2020-00734).
*SharkNinja Operating LLC, SharkNinja Management LLC, and SharkNinja Sales Company*, Petitioners, v. *iRobot Corporation*, Patent Owner, Case IPR2020-00734, U.S. Pat. No. 9,921,586, Petitioners' Updated Exhibit List, filed Apr. 23, 2021, 4 pages (IPR2020-00734).
*SharkNinja Operating LLC, SharkNinja Management LLC, and SharkNinja Sales Company*, Petitioners, v. *iRobot Corporation*, Patent Owner, Case IPR2020-00734, U.S. Pat. No. 9,921,586, Remote Zoom Deposition of Dr. Richard Hooper, Conducted Apr. 14, 2021, 84 pages (Exhibit 1028 in IPR2020-00734).
*SharkNinja Operating LLC, SharkNinja Management LLC, and SharkNinja Sales Company*, Petitioners, v. *iRobot Corporation*, Patent Owner, Case No. PGR2021-00079, U.S. Pat. No. 10,990,110, Declaration of Dr. Noah Cowan Regarding U.S. Pat. No. 10,990,110, (Exhibit 1003, PGR2021-00079), 55 pages.
*SharkNinja Operating LLC, SharkNinja Management LLC, and SharkNinja Sales Company*, Petitioners, v. *iRobot Corporation*, Patent Owner, Case No. PGR2021-00079, U.S. Pat. No. 10,990,110, Petition for Post-Grant Review of U.S. Pat. No. 10,990,110, Filed Apr. 28, 2021, 60 pages.
*SharkNinja Operating LLC, SharkNinja Management LLC, and SharkNinja Sales Company*, Petitioners, v. *iRobot Corporation*, Patent Owner. Case No. IPR2020-00734, U.S. Pat. No. 9,921,586, Petitioners' Updated Exhibit List, Filed Jul. 7, 2021, 4 pages.
Statutory Disclaimer in Patent under 37 CFR § 1.321(a), *SharkNinja* v. *iRobot*, Case No. IPR2020-00734, dated Jul. 7, 2020, 5 pages (IPR2020-00734, Exhibit No. 2001).
U.S. Pat. No. 10,990,110, issued on Apr. 27, 2021, Chiappetta, (Exhibit 1001, PGR2021-00079), 38 pages.
U.S. Pat. No. 6,781,338, issued on Aug. 24, 2004, Jones et al. (Exhibit 1018, PGR2021-00079), 18 pages.
U.S. Pat. No. 8,972,052, issued on Mar. 3, 2015, Chiappetta, (Exhibit 1010, PGR2021-00079), 51 pages.
U.S Publication No. 2020/0218282, published on Jul. 9, 2020, Chiappetta, (Exhibit 1005, PGR2021-00079), 36 pages.
U.S. Appl. No. 17/037,057, Prosecution History of the '110 patent, Chiappetta et al., issued on Apr. 27, 2021, (Exhibit 1002, PGR2021-00079), 178 pages.
U.S. Pat. No. 10,599,159, issued on Mar. 24, 2020, Chiappetta, (Exhibit 1006, PGR2021-00079), 38 pages.

U.S. Pat. No. 6,594,844, issued on Jul. 22, 2003, Jones, (Exhibit 1014, PGR2021-00079), 26 pages.
U.S. Pat. No. 6,690,134, issued on Feb. 10, 2004, Jones et al., (Exhibit 1017, PGR2021-00079), 19 pages.
U.S. Pat. No. 6,809,490, issued on Oct. 26, 2004, Jones et al., (Exhibit 1016, PGR2021-00079), 28 pages.
U.S. Pat. No. 6,883,201, issued on Apr. 26, 2005, Jones et al., (Exhibit 1020, PGR2021-00079), 26 pages.
U.S. Pat. No. 7,024,278, issued on Apr. 4, 2006, Chiappetta et al., (Exhibit 1019, PGR2021-00079), 26 pages.
U.S. Pat. No. 7,332,890, issued Feb. 19, 2008, Cohen et al., (Exhibit 1021, PGR2021-00079), 26 pages.
U.S. Pat. No. 7,706,917, issued on Apr. 27, 2010, Chiappetta et al., (Exhibit 1013, PGR2021-00079), 36 pages.
U.S. Pat. No. 8,594,840, dated Nov. 26, 2013, Chiappetta et al., (Exhibit 1011, PGR2021-00079), 45 pages.
U.S. Pat. No. 8,634,956, issued on Jan. 21, 2014, Chiappetta et al., (Exhibit No. 1012, PGR2021-00079), 40 pages.
U.S. Pat. No. 9,223,749, issued on Dec. 29, 2015, Chiappetta, (Exhibit 1009, PGR2021-00079), 49 pages.
U.S. Pat. No. 9,529,363, issued on Dec. 27, 2016, Chiappetta, (Exhibit 1008, PGR2021-00079), 37 pages.
U.S. Pat. No. 9,921,586, dated Mar. 20, 2018, Chiappetta et al., (Exhibit 1007, PGR2021-00079), 38 pages.
U.S. Publication No. 2008/0294288, published on Nov. 27, 2008, Yamauchi, (Exhibit 1022, PGR2021-00079), 61 pages.
U.S. Publication No. 2009/010229, published Apr. 23, 2009, Greene et al., (Exhibit 1023, PGR2021-00079), 113 pages.
U.S. Pat. No. 5,440,216, issued on Aug. 8, 1995, Kim (Exhibit No. 1012 in IPR2020-00734).
U.S. Pat. No. 9,921,586, issued on Mar. 20, 2018, Chiappetta (Exhibit No. 1001 in IPR2020-00734).
US Publication No. 2002/0156556, issued on Oct. 24, 2002, Ruffner (Exhibit No. 1006 in IPR2020-00734).
US Publication No. 2004/0083570, published on May 6, 2004, Song et al. (Exhibit No. 1011 in IPR2020-00734).
US Publication No. 2004/0167667, published on Aug. 26, 2004, Goncalves et al. (Exhibit No. 1014 in IPR2020-00734).
US Publication No. 2005/0000543, published on Jan. 6, 2005, Taylor et al. (Exhibit No. 1015 in IPR2020-00734).
US Publication No. 2005/0000543, published on Jan. 6, 2005, Taylor et al., 32 pages (Exhibit No. 1026 in IPR2020-00734).
US Publication No. 2005/0288079, published on Dec. 29, 2005, Tani, 31 pages (Exhibit No. 1027 in IPR2020-00734).
W.O Publication No. 2004/025947, published on Mar. 25, 2004, Chiappetta, (Exhibit 1015, PRG2021-00079), 57 pages.
*SharkNinja Operating LLC, SharkNinja Management LLC, and SharkNinja Sales Company*, Petitioner, v. *iRobot Coporation*, Patent Owner. IPR2020-00734, U.S. Pat. No. 9,921,586 B2, Final Written Decision Determining Some Challenged Claims Unpatentable, Entered Oct. 4, 2021, 29 pages.
*SharkNinja Operating LLC, SharkNinja Management LLC, and SharkNinja Sales Company*, Petitioners', v. *iRobot Corporation*, Patent Owner. Case No. IPR2020-00734, U.S. Pat. No. 9,921,586, Patent Owner's Notice of Appeal, Dec. 6, 2021, 36 pages.
*SharkNinja Operating LLC, SharkNinja Management LLC, and SharkNinja Sales Company*, Petitioners', v. *iRobot Corporation*, Patent Owner. Case No. IPR2020-00734, U.S. Pat. No. 9,921,586, Petitioners' Notice of Cross-Appeal, Filed Dec. 20, 2021, 34 pages.
U.S. Appl. No. 15/491,603, filed Apr. 19, 2017.
U.S. Appl. No. 15/366,367, filed Dec. 1, 2106.
U.S. Appl. No. 14/966,621, filed Dec. 11, 2015.
U.S. Appl. No. 13/731,393, filed Dec. 31, 2012.
U.S. Appl. No. 12/611,814, filed Nov. 3, 2009.
*SharkNinja Operating LLC, SharkNinja Management LLC, and SharkNinja Sales Company*, Petitioners, v. *iRobot Corporation*, Patent Owner, Case PGR2021-00079, U.S. Pat. No. 10,990,110, Patent Owner's Response, dated Feb. 1, 2022, 29 pages.
*SharkNinja Operating LLC, SharkNinja Management LLC, and SharkNinja Sales Company*, Petitioners, v. *iRobot Corporation*, Patent Owner. Case IPR2020-00735, U.S. Pat. No. 10,045,676,

(56) References Cited

OTHER PUBLICATIONS

Petitioner's Reply to Patent Owner's Response, (iRobot Exhibit 2002, *SharkNinja* v. *iRobot* PGR2021-00079), dated Feb. 1, 2022, 28 pages.

* cited by examiner

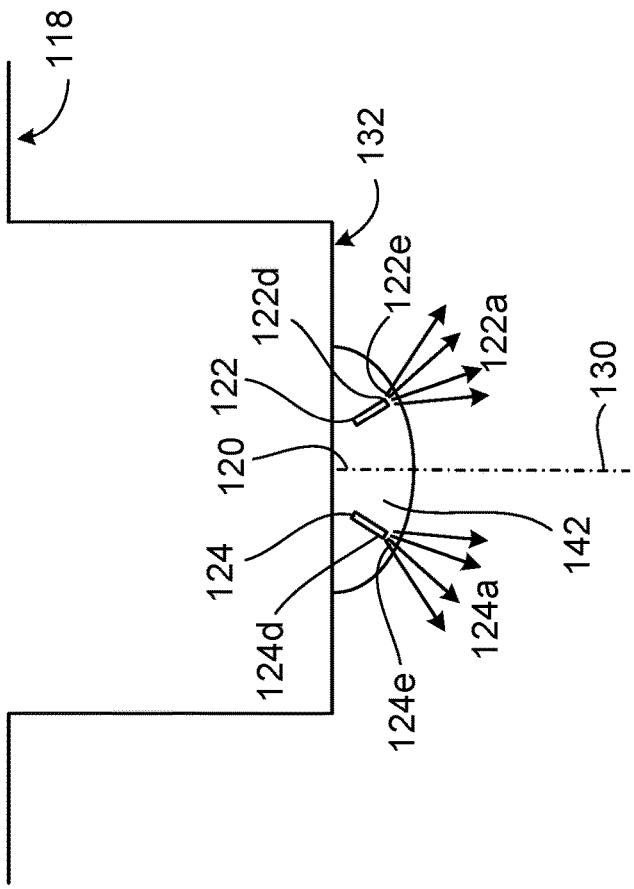
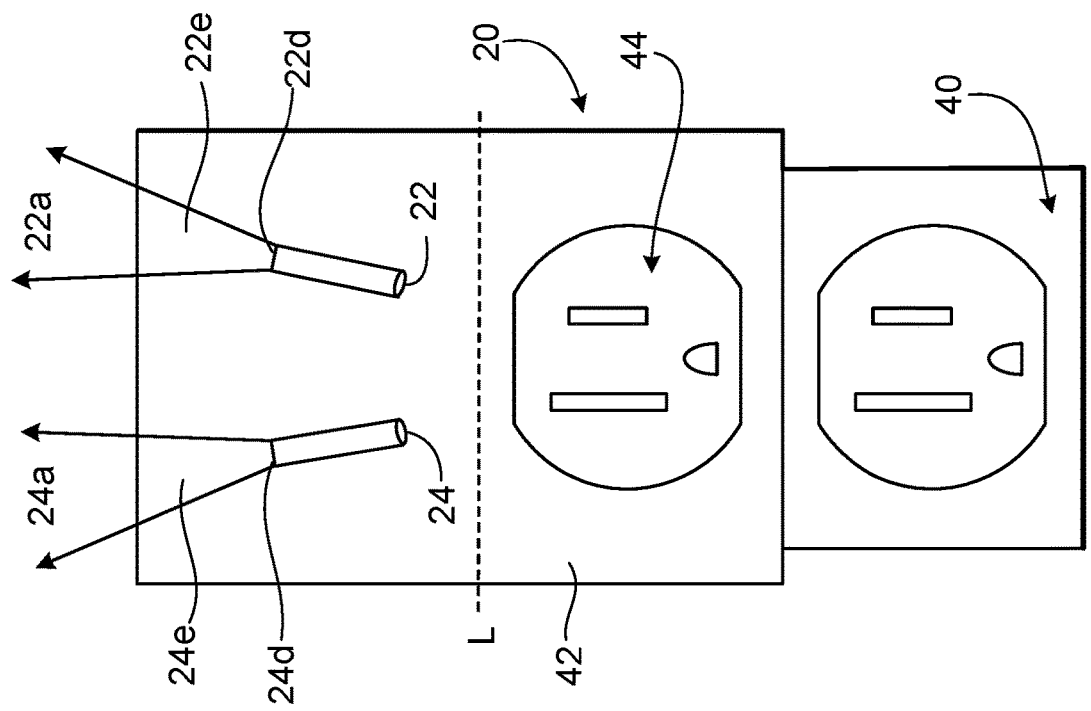
FIG. 3B
FIG. 3A

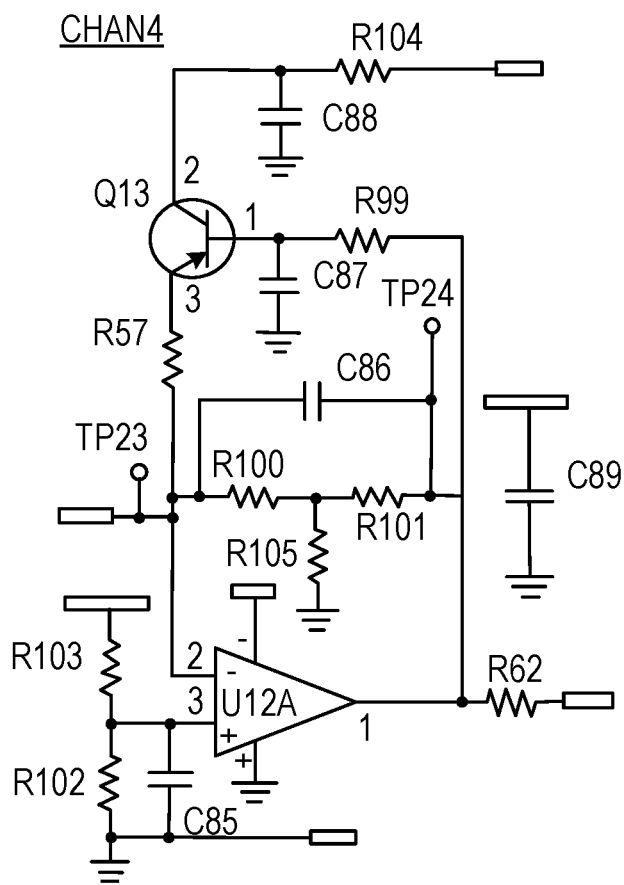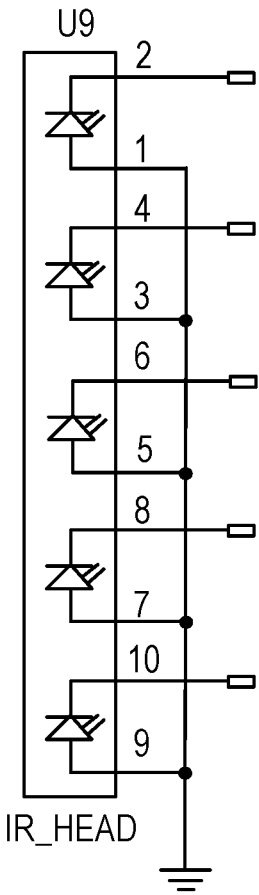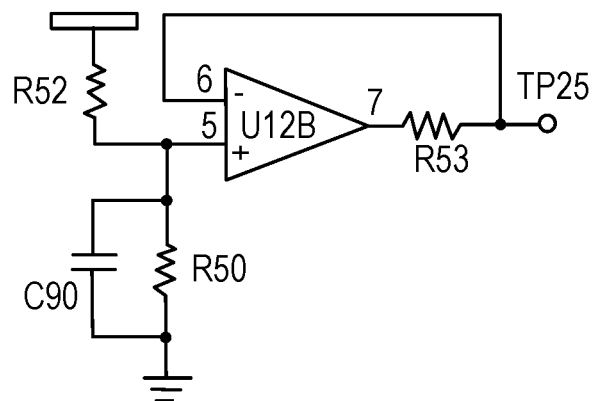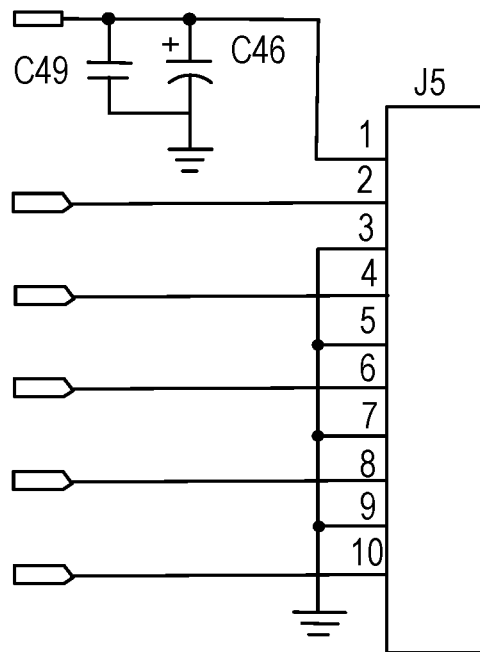
FIG. 11B

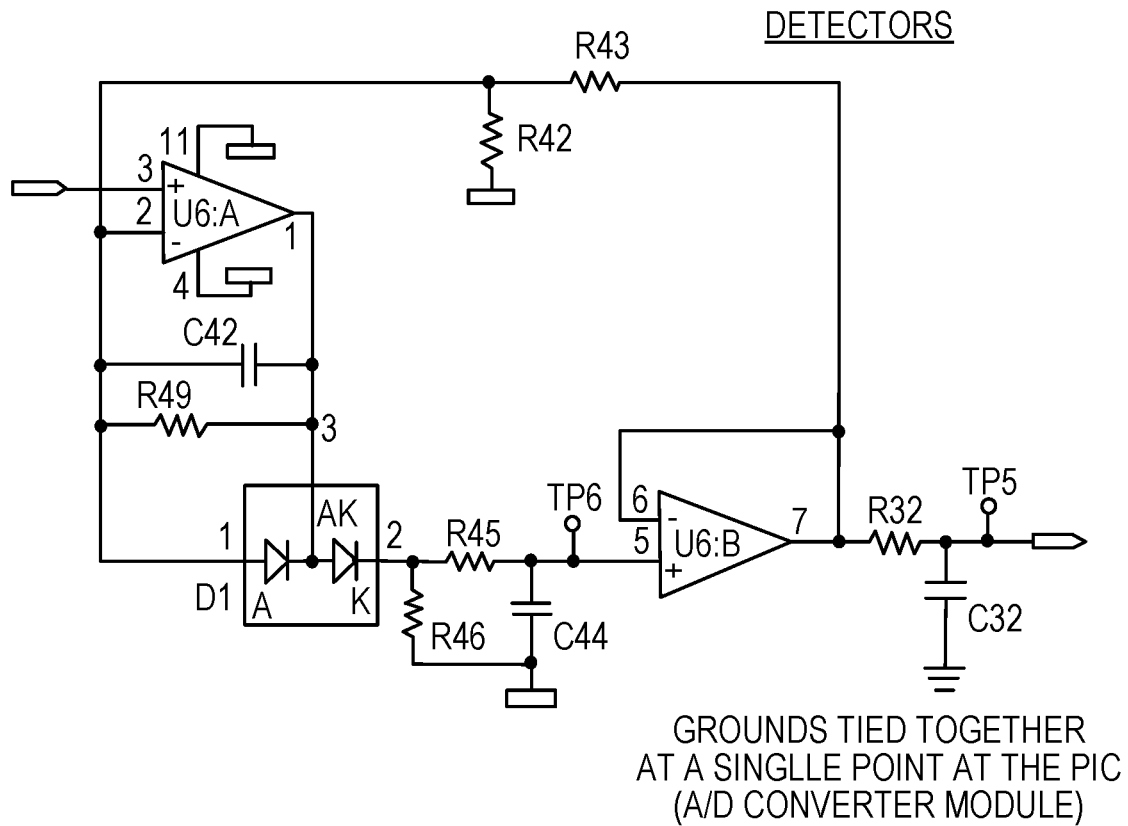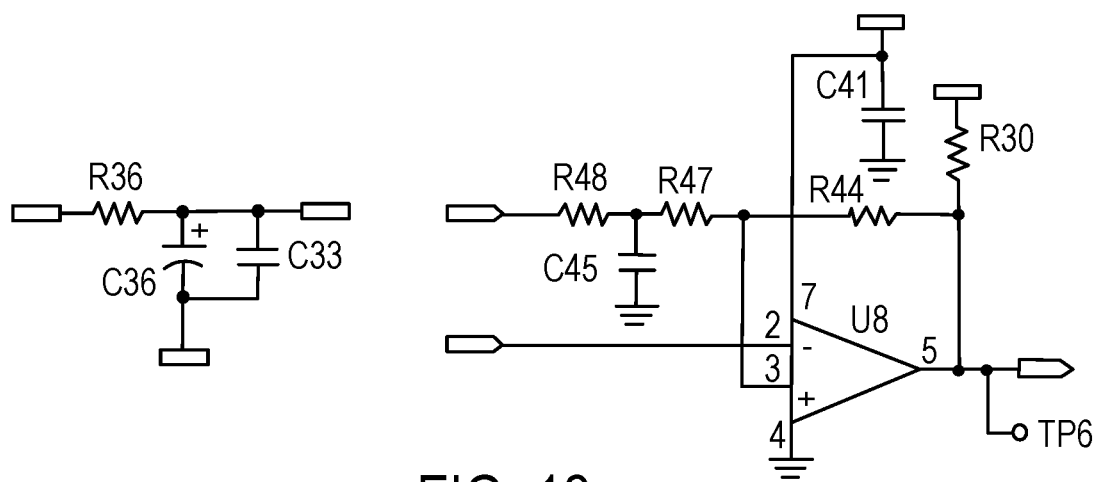
FIG. 13

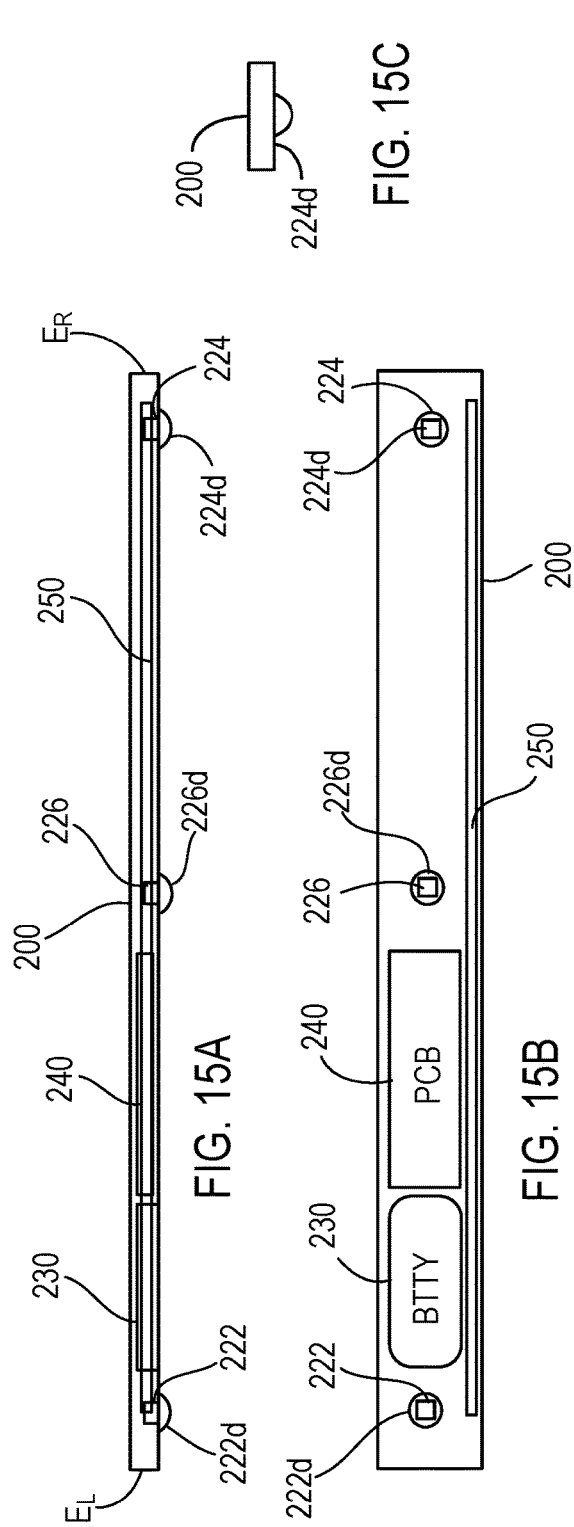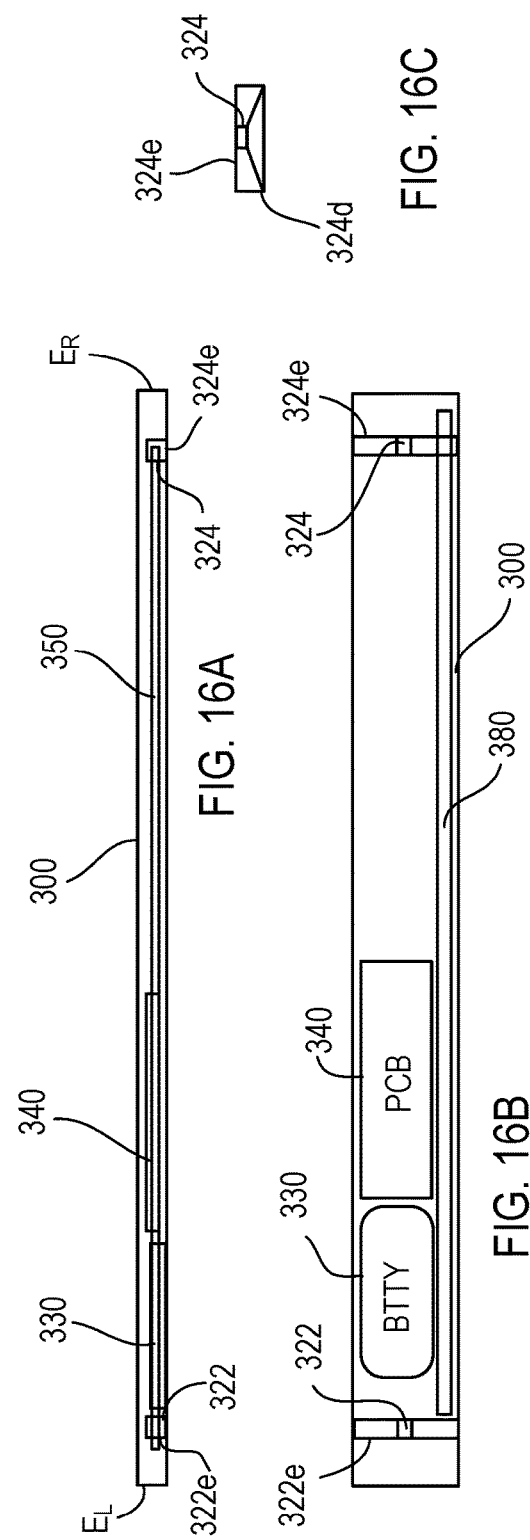

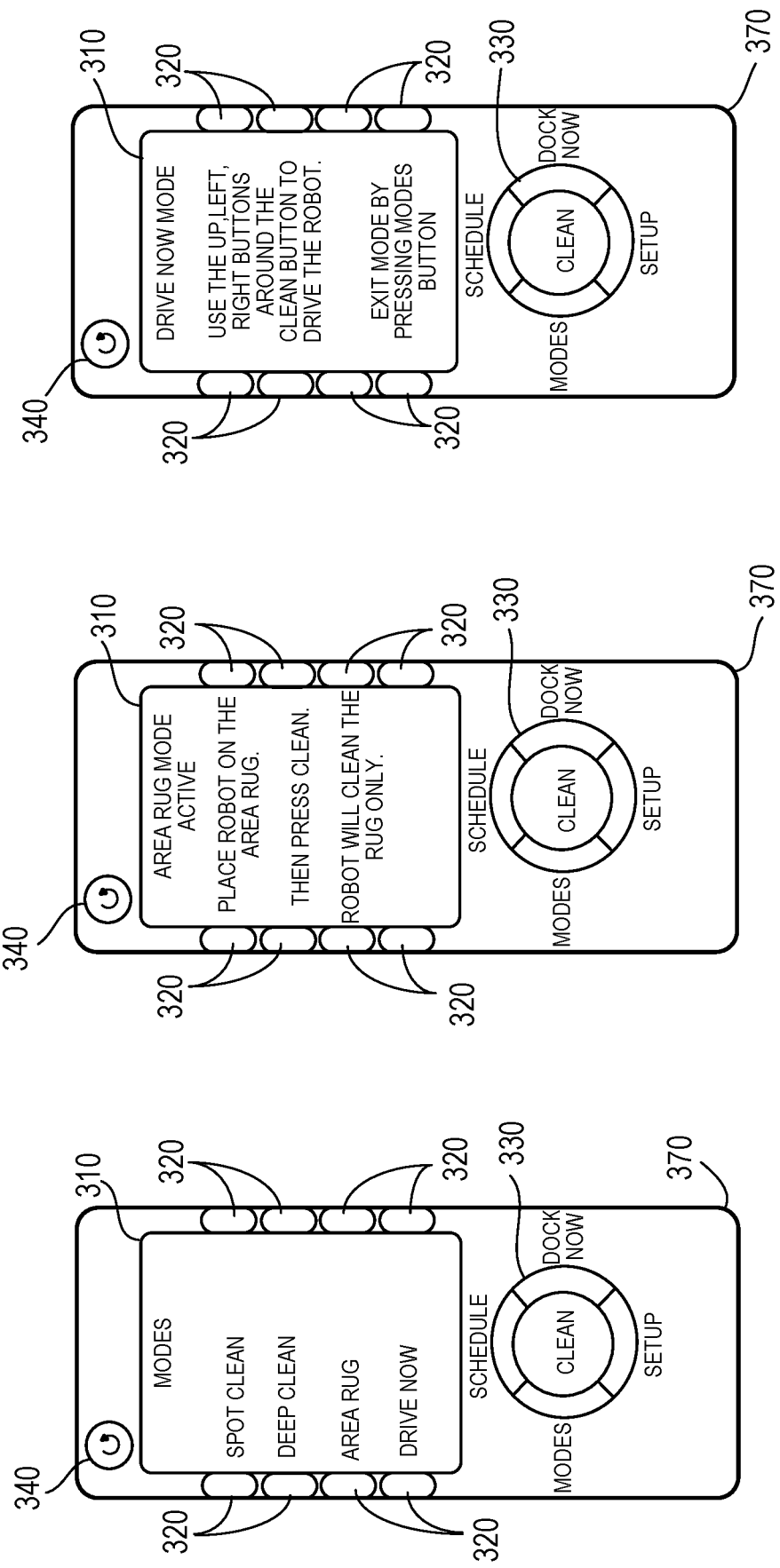

CELESTIAL NAVIGATION SYSTEM FOR AN AUTONOMOUS VEHICLE

INTRODUCTION

This application is a continuation application of and claims priority to U.S. patent application Ser. No. 16/827,447, filed on Mar. 23, 2020, which is a continuation application of and claims priority to U.S. patent application Ser. No. 15/491,603, now U.S. Pat. No. 10,599,159, filed on Apr. 19, 2017, which is a continuation of U.S. patent application Ser. No. 15/336,367, now U.S. Pat. No. 9,921,586, filed on Dec. 1, 2016, which is a continuation of patent application Ser. No. 14/966,621, now U.S. Pat. No. 9,529,363, filed on Dec. 11, 2015, which is a continuation of U.S. patent application Ser. No. 13/731,393, now U.S. Pat. No. 9,223,749, filed on Dec. 31, 2012, which is a continuation of U.S. patent application Ser. No. 12/611,814, now U.S. Pat. No. 8,972,052, filed on Nov. 3, 2009. All of the foregoing applications are incorporated by reference in their entireties in the present application.

The present teachings relate to robotic systems and, more specifically, to navigation systems for autonomous vehicles.

BACKGROUND

Autonomous vehicles including robotic devices are becoming more prevalent today and are used to perform tasks traditionally considered mundane, time-consuming, or dangerous. As programming technology increases, so does the demand for robotic devices that can navigate around a complex environment or working space with little or no assistance from a human operator.

Autonomous vehicles and associated controls, navigation systems, and other related systems are being developed. For example, U.S. Pat. No. 6,594,844 discloses a Robot Obstacle Detection System, the disclosure of which is hereby incorporated by reference in its entirety. Additional robot control and navigation systems, and other related systems, are disclosed n PCT Published Patent Application No. WO 2004/025947, and in U.S. Pat. Nos. 6,809,490, 6,690,134, 6,781,338, 7,024,278, 6,883,201, and 7,332,890, the disclosures of which are hereby incorporated by reference in their entireties.

Many autonomous vehicles navigate a working space by moving randomly until an obstacle is encountered. Generally, these types of vehicles have on-board obstacle detectors, such as bump sensors or similar devices, which register contact with an obstacle. Once contact is made, command routines can direct the autonomous vehicle to move in a direction away from the obstacle. These types of systems, which are useful for obstacle avoidance, are limited in their ability to allow an autonomous vehicle to track its location within a room or other working environment. Other systems, often used in conjunction with bump sensors as described above, use an infrared or other detector to sense the presence of nearby walls, obstacles, or other objects, and either follow the obstacle or direct the vehicle away from it. These systems, however, are also limited in their ability to allow an autonomous vehicle to navigate effectively in a complex environment, as they only allow the vehicle to recognize when objects are in its immediate vicinity.

In more advanced navigation systems, an autonomous vehicle comprises an infrared or other type of transmitter, which directs a series of infrared patterns in horizontal directions around the autonomous vehicle. These patterns can be detected by a stationary receiver placed at or near a boundary of the working space, for example on a wall. A microprocessor can use the information from signals generated by the receiver to calculate where in the working space the autonomous vehicle is located at all times. Using such systems, the vehicle can navigate around an entire area. These systems, however, are best employed in working spaces where few objects are present that may interfere with the dispersed patterns of infrared signals.

Limitations of the above types of navigation systems are, at present, a hurdle to creating a highly independent autonomous vehicle that can navigate in a complex environment.

SUMMARY

The present teachings provide a navigation control system for an autonomous vehicle. The system comprises a transmitter and an autonomous vehicle. The transmitter comprises an emitter for emitting at least one signal, a power source for powering the emitter, a device for capturing wireless energy to charge the power source, and a printed circuit board for converting the captured wireless energy to a form for charging the power source. The autonomous vehicle operates within a working area and comprises a receiver for detecting the at least one signal emitted by the emitter, and a processor for determining a relative location of the autonomous vehicle within the working area based on the signal emitted by the emitter.

The present teachings also provide a transmitter for use in a navigation control system for an autonomous vehicle. The transmitter comprises an emitter for emitting at least one signal, a power source for powering the emitter, a device for capturing wireless energy to charge the power source, and a printed circuit board for converting the captured wireless energy to a form for charging the power source.

The present teachings further provide a method for controlling navigation of an autonomous vehicle within one or more work areas. The method comprises emitting one or more signals from a transmitter, receiving the one or more signals on the autonomous vehicle, powering the transmitter with a power source, charging the power source wirelessly, localizing the autonomous vehicle with respect to the transmitter, and navigating the autonomous vehicle within the one or more work areas.

Additional objects and advantages of the present teachings will be set forth in part in the description which follows, and in part will be obvious from the description, or may be learned by practice of the teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate several embodiments of the present teachings and together with the description, serve to explain the principles of the present teachings.

BRIEF DESCRIPTION OF THE DRAWINGS

FIG. 3A is a side view of a stationary emitter in accordance with an exemplary embodiment of the present teachings.

FIG. 3B is a side view of a stationary emitter in accordance with another exemplary embodiment of the present teachings.

FIGS. 7-14 are schematic circuit diagrams of infrared receivers and transmitters for a navigation system in accordance with an exemplary embodiment of the present teachings.

FIGS. 15A-15C illustrate side, bottom, and end views, respectively, of an exemplary embodiment of a transmitter in accordance with the present teachings.

FIGS. 16A-16C illustrate side, bottom, and end views, respectively, of another exemplary embodiment of a transmitter in accordance with the present teachings.

FIGS. 21A-21C illustrate exemplary embodiments of mode screen on an exemplary remote control in accordance with the present teachings.

DESCRIPTION OF THE PRESENT TEACHINGS

Reference will now be made in detail to embodiments of the present teachings, examples of which are illustrated in the accompanying drawings. Wherever possible, the same reference numbers will be used throughout the drawings to refer to the same or like parts.

Figure 1:
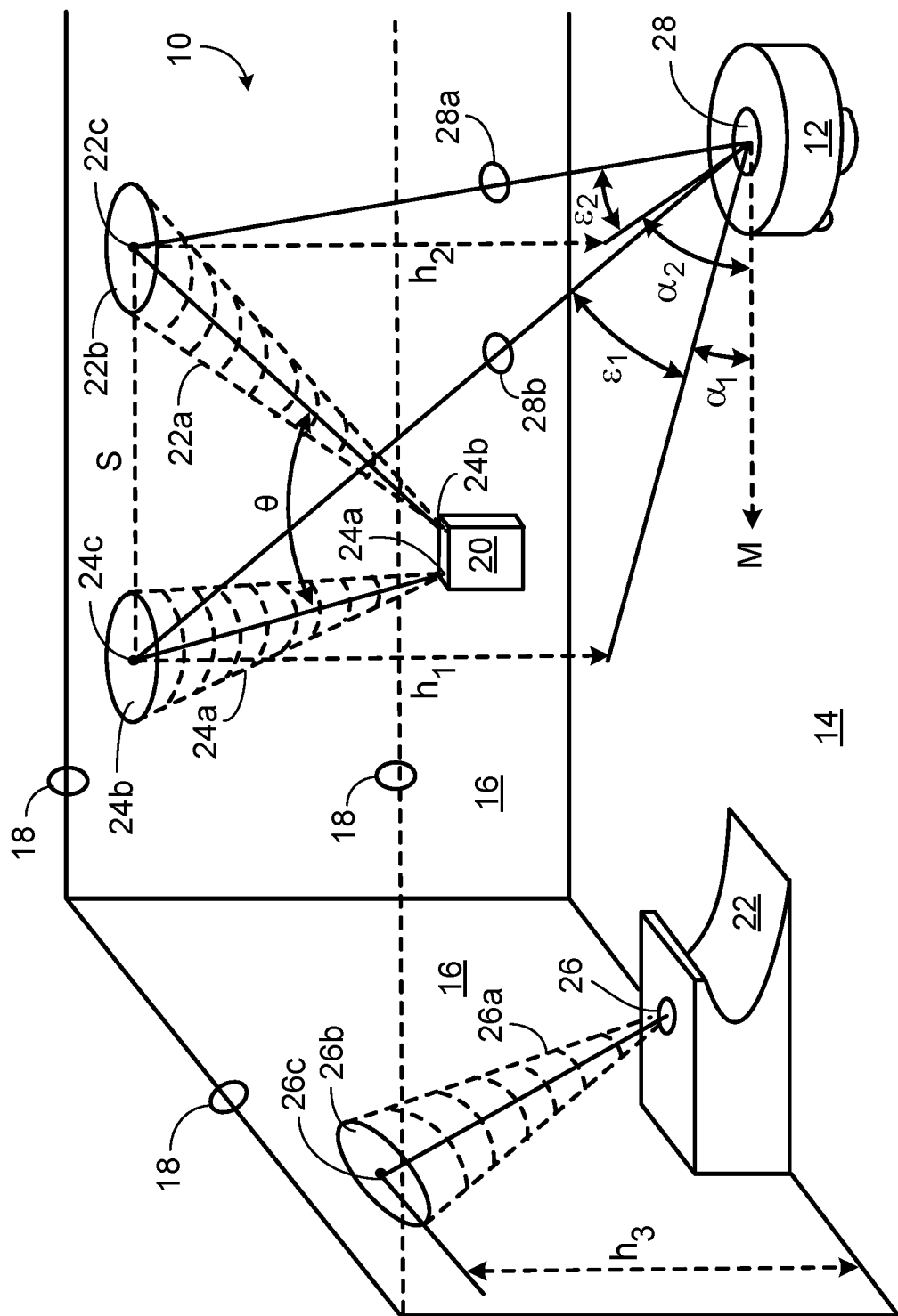
FIG. 1 is a schematic view of a navigation system for an autonomous vehicle in accordance with an exemplary embodiment of the present teachings.

In accordance with an exemplary implementation of the present teachings, FIG. 1 is a schematic view of a navigation system 10 for an autonomous vehicle such as a robotic cleaning device 12. The components of the system 10 include, in this embodiment, a transmitter 20, a charging or base station 22, and an autonomous vehicle 12 that operates in a room or other similar working area 14. The working area 14 can be a floor of a room, bounded at least in part by walls 16. Borders of a ceiling 18 intersect the walls 16 and are remote from the working area 14. The depicted transmitter 20 includes two emitters 24A, 24B. In this exemplary embodiment, the base station 22 includes an emitter 26 as well. In various embodiments, any combination or quantity of emitters may be used on the base station 22, or transmitter 20, or both. The autonomous vehicle 12 can include an on-board microprocessor, power and drive components, task-specific components (dirt sensors, vacuums, brushes, etc.), and at least one receiver, such as an infrared receiver 28. The vehicle 12 may also include certain buttons, switches, etc., for programming the robot, or such instructions may be directed by a remote control (see FIG. 18) or a personal computer (not shown). Depending on the application, certain components may be removed from the disclosed system 10, or other components may be added.

For simplicity, this disclosure will describe vacuuming as a demonstrative task of the depicted robotic cleaning device 12. It will be apparent, though, that the navigation system disclosed herein has wide applications across a variety of autonomous systems. For example, an autonomous vehicle may be used for floor waxing and polishing, floor scrubbing, ice resurfacing, sweeping and vacuuming, unfinished floor sanding, stain/paint application, ice melting and snow removal, grass cutting, etc. Any number of task-specific components may be required for such duties, and may each be incorporated into the autonomous vehicle, as necessary.

The transmitter 20 directs at least two infrared signals 22a, 24a from emitters 24A and 24B to a surface remote from the working area 14 upon which the autonomous vehicle 12 operates. The depicted embodiment directs the infrared signals 22a, 24a to the ceiling 18, but it may also direct the signals 22a, 24a to a portion of a wall 16 or to both the walls 16 and ceiling 18. The signals 22a, 24a can be directed to a variety of points on the remote surface, but directing the signals as high as possible above the working area 14 can allow the signals 22a, 24a to be more easily detected by the autonomous vehicle 12, because the field of view of the autonomous vehicle's receiver 28 is less likely to be blocked by an obstacle (such as, for example, a high-backed chair or tall plant). In this disclosure, the regions of contact 22b, 24b of the signals 22a, 24a on the remote surface will be referred to as "points," regardless of the size of the intersection. For example, by using a collimator in conjunction with the emitters (described below), the points of intersection 22b, 24b of the signals 22a, 24a can be a finite area with the signal strongest at approximately central points.

In certain embodiments of the transmitter 20, the signals 22a, 24a are directed toward a ceiling 18, at two points 22c, 24c, forming a line proximate and parallel to the wall 16 upon which the transmitter 20 is located. Alternatively, and as depicted in FIG. 1, the signals 22a, 24a can be directed away from the wall 16, at an angle of approximately 5° or more, to avoid interference with objects such as pictures secured to or hung from the wall 16. The signals 22a, 24a can be transmitted at a known angle θ therebetween. In an exemplary embodiment, angle θ can equal approximately 30', but other angles are contemplated by the present teachings. In accordance with certain embodiments, angle θ can be set at the time of manufacture or user-defined based on particular applications or other requirements. By setting the angle θ to a known value, the distance S between the signals 22a, 24a at the point of contact 22c, 24c with ceiling 18 may be determined, provided the heights of the ceiling $h_1$, $h_2$ at the points of contact 22c, 24c are known. When used on a flat ceiling 18, as depicted, $h_1$ equals $h_2$. In the embodiment depicted in FIG. 1, base station 22 emits a signal 26a that can serve as an additional or optional signal for utilization by the autonomous vehicle 12. Signal 26a is directed toward a wall 16, so that the point of contact 26b is high enough to avoid objects that may obstruct the autonomous vehicle's field of view. A central point 26c (or laser point) of the point of contact 26b contacts the wall 16 at height h3.

Figure 2:
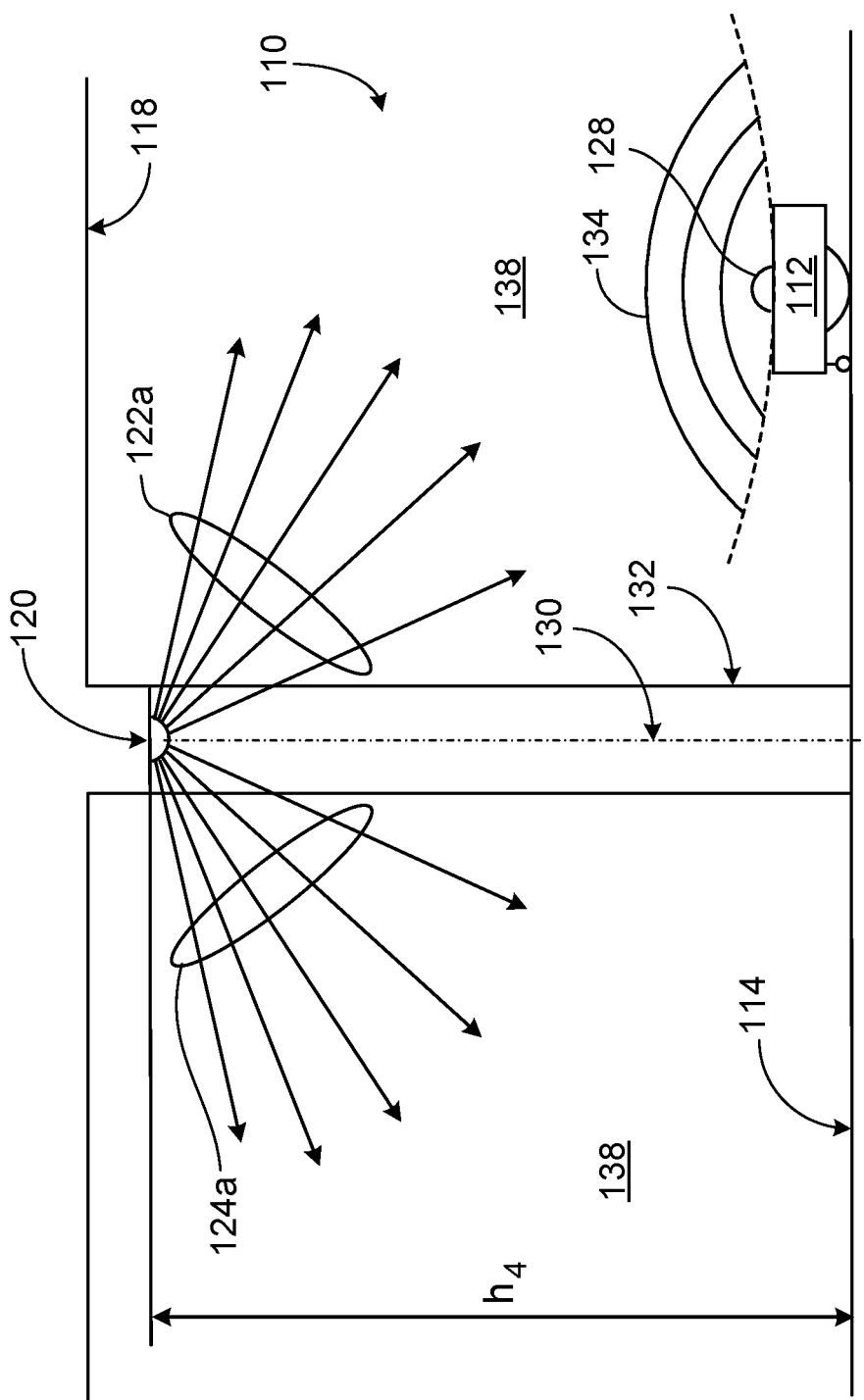
FIG. 2 is a schematic view of a navigation system for an autonomous vehicle in accordance with another exemplary embodiment of the present teachings.

As the autonomous vehicle 12 moves within a working area 14, it detects the signals 22a, 24a emitted by the transmitter 20 as energy bouncing or reflecting off of the diffuse ceiling surface 18. In an alterative embodiment, visible points can be used in place of infrared points. A camera onboard the autonomous vehicle can replace the infrared receiver in detecting either infrared or visible points. The autonomous vehicle's microprocessor can convert the signals 22a, 24a sensed by the receiver 28 into bearings from the robot 12 to the signals 22a, 24a. The microprocessor can then calculate representative elevation angles $\varepsilon_1$, $\varepsilon_2$ and azimuths $\alpha_1$, $\alpha_2$ of the signals to determine the location of the autonomous vehicle 12 within the working area 14. In this embodiment, the azimuths $\alpha_1$, $\alpha_2$ are measured using a "forward" direction of movement M of the autonomous vehicle 12 as a datum, but any suitable datum can be used. By calculating the elevation angle and azimuth from the autonomous vehicle 12 to the two signals 22a, 24a, the autonomous vehicle 12 can locate itself within a working area with improved accuracy, FIG. 2 depicts another exemplary embodiment of a navigation system 110 for an autonomous vehicle 112. In the illustrated exemplary embodiment, an autonomous vehicle 112 moves in a working area having a floor 114. A transmitter 120 can be mounted at a top frame of a doorway 132 between two rooms 136, 138. Similar to the embodiment depicted in FIG. 1, the transmitter 120 is installed at a known distance $h_4$ above the floor 114. In alternative embodiments, the transmitter 120 can be installed at the height of the ceiling 118. The transmitter 120 can be recessed within the door frame 130 or ceiling 118 to reduce its profile and limit its impact on architectural aesthetics of a room. Additionally, the transmitter 120 can be disguised to resemble a cover plate for a sprinkler head, speaker, or other device.

The transmitter 120 emits two signals 122a, 124a (depicted graphically by a plurality of arrows) Into the two rooms 136, 138, respectively. The signals 122a, 124a can be configured to not overlap each other, thus providing a distinct signal on each side of the door centerline 130. In other embodiments, an overlap of the signals 122a, 124a can be desirable. The autonomous vehicle 112 includes a receiver 128 having a field of vision 134. The emitted signals 1220, 124a can be detected by the receiver 128 when the autonomous vehicle's field of vision 134 intersects the signals 122a, 124a. Similar to the embodiment of FIG. 1, the autonomous vehicle can calculate the azimuth and elevation to the transmitter 120 to determine its relative location. Similar to the embodiment described above, by detecting only one signal, the autonomous vehicle 112 can calculate a bearing to the transmitter 120. Accordingly, the transmitter 120 functions as a beacon for the autonomous vehicle 112 to follow and, if the signal is coded, the autonomous vehicle 112 can determine which room of a number of rooms it is located in, based on the coded signal. The autonomous vehicle 112 is thus able to determine its relative location, on a room-by-room basis, as opposed to determining its location within a room. Exemplary embodiments of a doorway-based transmitter are described in more detail with reference to FIGS. 15-18.

FIG. 3A shows a transmitter 20 in accordance with certain embodiments of the present teachings. The depicted transmitter 20 receives power from a wall outlet 40 for convenience and unobtrusiveness, but one skilled in the art will appreciate that transmitters can be powered by means other than a wall outlet. For example, the transmitter can be placed anywhere in a room, provided it has an available power source. For example, battery-powered transmitters are particularly versatile, because they can be located remote from a wall outlet. Such battery-operated transmitters can be unobtrusively located above window or door frames, or on top of tall furniture such as dressers or bookshelves.

In accordance with various embodiments of the present teachings, the transmitter can include a visible signal option (not shown), aligned with the emitted signals, allowing a user to direct the signals to particular locations. In accordance with the present teachings, more than one transmitter maybe used. Such a system could include communication capability between the various transmitters, for example to ensure that only one signal or a subset of signals is emitted at any given time.

A battery-powered transmitter located above a window or door frame can not only permit the autonomous vehicle to localize within a map, coordinate system, or cell grid relative to the transmitter, but can also localize the transmitter within the same map, coordinate system, or cell grid, thereby localizing the window or door frame. Localization of an autonomous vehicle within a working environment is described in detail in U.S. Patent Publication No. 2008/0294288, filed Nov. 27, 2008, the entire disclosure of which is incorporated herein by reference. In the case of a door frame, the door is ordinarily the passage by which the autonomous vehicle navigates from room to room. The transmitter illustrated in FIG. 3A, which can project points upward onto a wall or ceiling, can be battery operated. A transmitter as illustrated in FIGS. 3B-3D can be placed above or at the top of a door (e.g., more than six feet high, where household power may be unavailable) and can also benefit from battery operation (see below).

The exemplary embodiment of a transmitter 20 illustrated in FIG. 3A includes a housing 42 constructed of, for example, a plastic or like material. In this figure, the transmitter 20 is shown cut-away above the line L so that the emitters can be seen. The transmitter 20 can include a power receptacle 44, allowing the outlet used by the transmitter 20 to remain available for other uses. The transmitter 20 includes two emitters 24A, 248, set within the housing 42. Alternatively, the emitters 24A, 24B can be flush with or extend beyond the housing 42. Setting the emitters 24A, 24B within the housing 42 allows the signals 22a, 24a to be directed by utilizing collimators 22e, 24e. The collimators 22e, 24e can be formed within the housing 42 or can be discreet components within the housing 42. Alternatively, the collimators 22e, 24e can be secured to the outside of the housing 42. In alterative embodiments, lenses 22d, 24d can be included, with or without collimators 22e, 24e, to focus and direct the signals 22a, 24a. These basic manufacturing considerations can also be adapted for emitters located on charging or base stations. One or more emitters on a base station can serve as an additional point of navigation for the autonomous vehicle within the room, or may simply aid the autonomous vehicle in locating the base station.

FIG. 38 depicts an embodiment of a transmitter 120 for use, for example, with the navigation system 110 depicted in FIG. 2. The transmitter 120 is secured to the underside of an upper cross member of the door frame 132, but can also be recessed therein or secured to or recessed in a ceiling 118. The transmitter 120 includes two emitters 122, 124. Other embodiments of the transmitter 120 can include more than two emitters or a single emitter. By utilizing two emitters, the transmitter 120 can direct signals into two different rooms, on either side of the centerline 130 of the door frame 132. This can allow an autonomous vehicle to distinguish which room it is located in.

In accordance with various embodiments of the present teachings, more than two emitters can be utilized with collimators 22e, 24e, 122e, 124e, to distinguish different areas within a room. Such a configuration allows the autonomous vehicle to sense its relative location within a room and adjust its cleaning behavior accordingly. For example, a signal could mark an area of the room that an autonomous vehicle would likely get stuck in. The signal could allow an autonomous vehicle to recognize the area and accordingly not enter it, even though it might otherwise be able to do so unimpeded. Alternatively, or in addition, different signals could mark areas that require different cleaning behaviors (e.g., due to carpeting or wood floors, high traffic areas, etc.).

Turning back to FIG. 3B, the emitters 122, 124 can be installed flush with or extend beyond the housing 142. Setting the emitters 122, 124 within the housing 142 allows the signals 122a, 124a to be directed by utilizing collimators 122e, 124e. The collimators 122e, 124e allow the signals 122a, 124a to be directed to two sides of a centerline 130 of a doorframe 132, without any signal overlap, if so desired. The collimators 122e, 124e can be formed within the housing 142 or can be discreet components within the housing 142. Alternatively, the collimators 122e, 124e can be secured to the outside of the housing 142. In alterative embodiments, lenses 122d, 124d may be included, with or without collimators 122e, 124e, to focus and direct the signals 122a, 124a.

In various embodiments of the present teachings, each signal (regardless of the emitter's location or the number of signals) can be modulated at 10 kHz and coded with an 6-bit code serving as a unique signal identifier, preventing the autonomous vehicle from confusing one signal or point with another. Accordingly, more than two uniquely encoded signals can be employed to increase the accuracy of the autonomous vehicle's calculations regarding its location within a working area. As noted above, using only one emitter allows an autonomous vehicle to take a heading based on that signal. Using two or more signals can allow the autonomous vehicle to continue navigating if fewer than all of the signals are detected (either due to a failure of a signal transmission or the autonomous vehicle moving to a location where fewer than all of the signals are visible).

In certain embodiments, the transmitter can pulse the coded signals as follows. After an initial synchronization pulse, a first signal at 10 kHz is emitted for 100 ms. This can provide a sufficient time for the autonomous vehicle's receiver and processor to calculate azimuth and elevation angles, as discussed in detail below. So that the autonomous vehicle can determine which signal is being received, the transmitter can pulse a series of five bits, each for 10 ms. The five bits include two start bits, for example a zero and a one, followed by a unique three bit identifier to identify that particular signal or point. After a 100 ms delay, the transmitter repeats the sequence for the second signal or point. By changing the modulation frequency and/or the identifier, the second signal or point can be uniquely distinguished from the first. Any number of unique signals can be transmitted and identified in this manner. After the series of signals are transmitted, the transmitter can wait a substantially longer period of time, for example on the order of one to two seconds, before repeating the transmitting sequence, starting again with the first signal. The length of time for each transmission is merely exemplary, and may be varied based on a particular application, device, etc. As stated above, the signals can be modulated at the same or different frequencies.

Figure 4A:
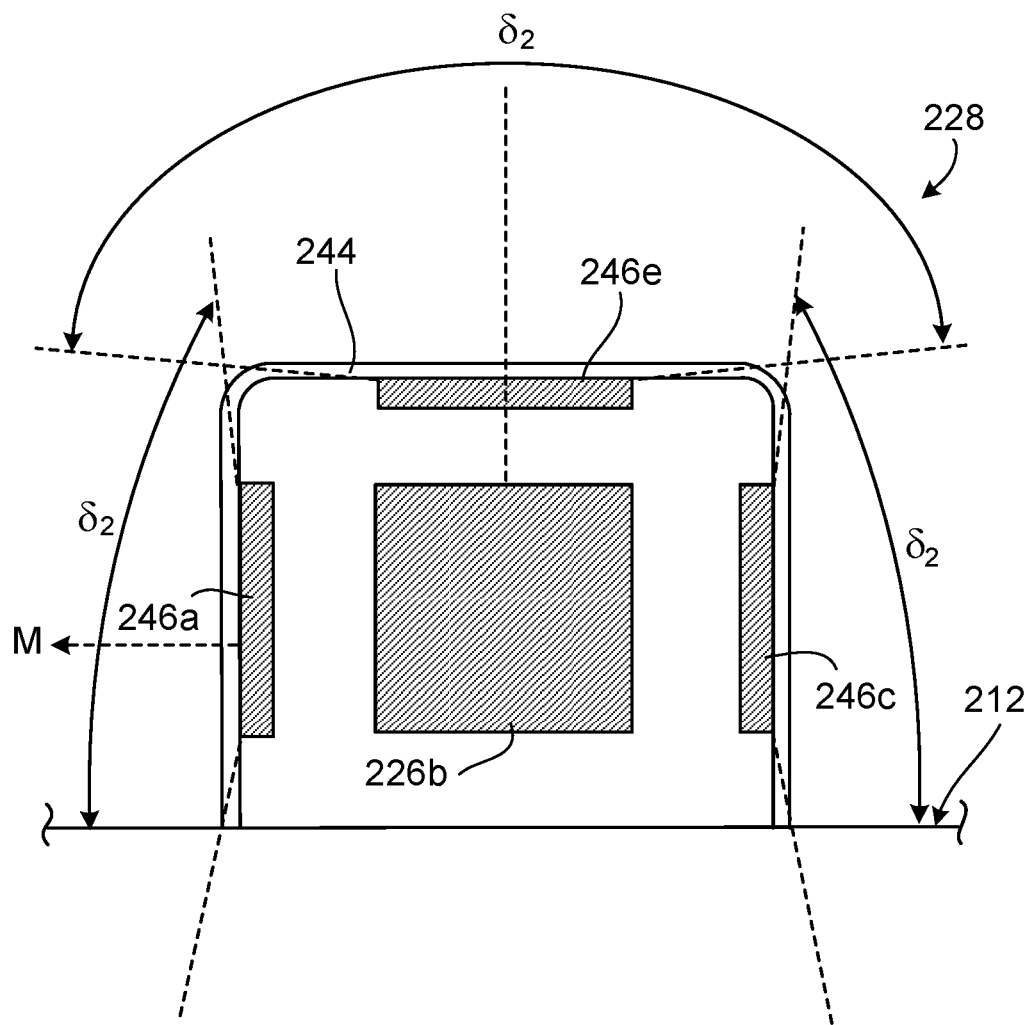
FIG. 4A is a side view of an infrared receiver for an autonomous vehicle in accordance with an exemplary embodiment of the present teachings.
Figure 4B:
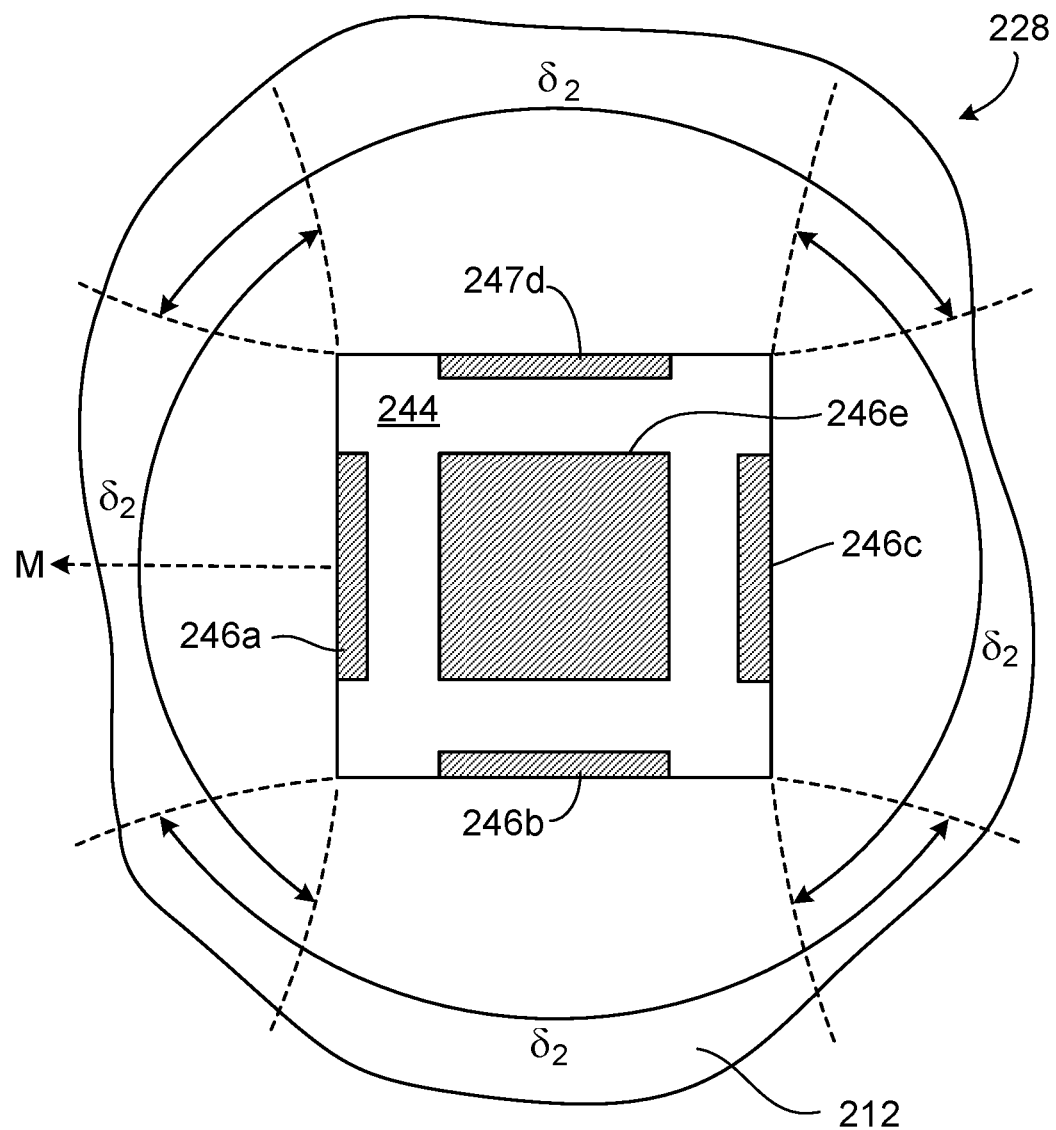
FIG. 4B is a top view of the infrared receiver of FIG. 4A.

FIG. 4A depicts a side view of an exemplary receiver 228 that is surface mounted on a housing 212 of an autonomous vehicle. FIG. 4B is a top view of the same receiver 228. The receiver 228 can include an outer shell or housing 244 comprising a generally translucent or transparent, high-impact plastic or like material. Four photodiodes 246a, 246b, 246c, and 246d can be installed in an orientation in the housing 244 generally corresponding to four adjacent sides of a cube. Accordingly, each photodiode can be generally perpendicular to the photodiodes on either side of it and parallel to the photodiode opposite it. In certain embodiments, a fifth photodiode 246e can be located generally above the plane of orientation of photodiodes 246a-248d. At least one photodiode, in this case photodiode 246a, is oriented toward a direction of forward movement M of the robot. The photodiodes can be connected via control wiring and other components to the autonomous vehicles microprocessor and related systems. Installing a receiver 228 on top of the housing 212 can provide the autonomous vehicle with a wide field of view. As depicted, the field of view 61 for a horizontally-oriented photodiode 246e is extremely wide. Depending on the sensitivity of the photodiode 246e, the thickness or translucence of the plastic, and other factors, the field of view δ1 may approach or exceed 180°. Similarly, due to the orientation of photodiodes 246a-246d, their field of view δ2 approaches near vertical in an upward direction from the autonomous vehicle's housing 212 and is limited below only by the autonomous vehicle's housing 212. There can be an overlap between the fields of view δ1 and δ2 in the longitudinal plane, as depicted in FIG. 4B.

As illustrated in FIG. 4A, there can be overlap between the fields of view δ1 and δ2, allowing the autonomous vehicle to detect signals in its operating area. The overlap creates a total field of view for the receiver that approaches the entire volume of the room above the robot housing. Accordingly, this embodiment of the receiver 212, is well-suited to the exemplary embodiment of the navigation system depicted and described in FIG. 2, wherein a signal is projected into an entire room. Of course, this receiver 22B could also be used with the system depicted in FIG. 1. Although installing the receiver closer to or above a top surface of the autonomous vehicle can provide for a wider range of view, this configuration increases a height of the autonomous vehicle slightly and can limit autonomous vehicle travel beneath certain obstacles such as couches, low tables, or the like.

Figure 4C:
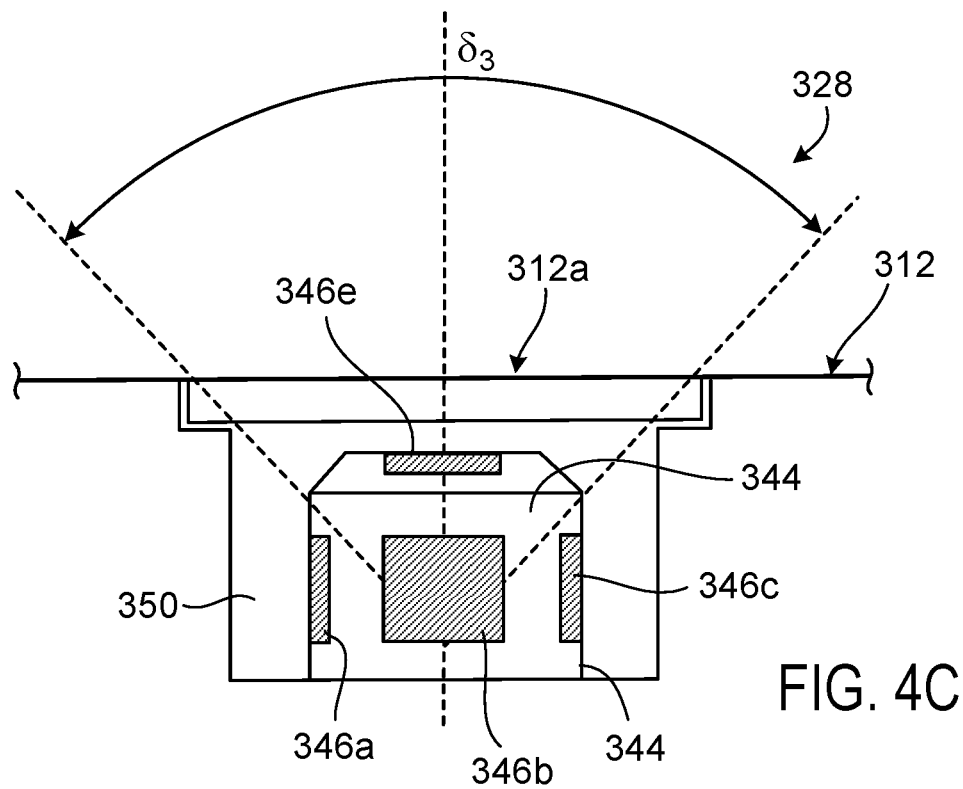
FIG. 4C is a side view of an infrared receiver for an autonomous vehicle in accordance with another exemplary embodiment of the present teachings.

FIG. 4C depicts an exemplary embodiment of the receiver 328 installed below a surface of the autonomous vehicle housing 312. The photodiodes 346a-346e (as a group referred to as 346) can be installed in a void 350 or other cavity below the surface of the autonomous vehicle housing 312. A translucent or transparent plastic cover 312a can be fitted over the photodiodes 346. The cover 312a can be secured to the housing 312, for example, with screws, press-fit connections, or other connectors. Alternatively, the cover 312a can be set in place without connectors, allowing easier access to the photodiodes 346 for service or replacement. This lower profile version reduces or eliminates the risk associated with a surface mounted receiver getting stuck below obstacles (as described above).

The construction of the receiver 328 can be similar to that of FIG. 4A. Four of the photodiodes 346a-346d can be installed orthogonal to each other, facing a predefined direction on the autonomous vehicle (e.g., front, back, right, and left). The fifth photodiode 346e can be installed orthogonal to the other four photodiodes, facing directly up from a top of the autonomous vehicle. Because the photodiodes 346 are set within the housing 312, the receiver's overall field of view δ3 can be limited to a certain degree. In this embodiment, δ3 equals approximately 120°. The field of view δ3 can be wider or narrower depending on the depth of installation below the surface of the autonomous vehicle housing 312. Alternatively, the field of view δ3 can be modified by utilizing a cover 312a having particular effects on signal transmission, such as a fish-eye lens or the like.

Figure 5A:
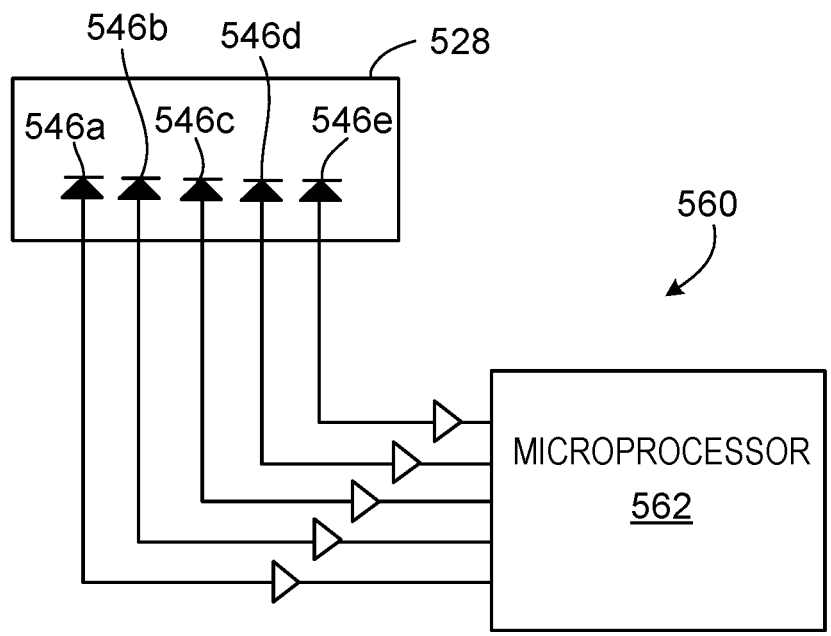
FIG. 5A illustrates a control system for an infrared receiver for an autonomous vehicle in accordance with an exemplary embodiment of the present teachings.

FIG. 5A illustrates an exemplary embodiment of a control schematic 560 for a receiver 528. The receiver 528 can include a number of independent photodiodes 546a-546e (as a group referred to as 546), pre-amplified and multiplexed into a single microprocessor 562. As described above, four of the photodiodes 546a-546d can be installed orthogonal to each other, facing a predefined direction on the autonomous vehicle (e.g., front, back, right, and left). A fifth photodiode 546e can be installed orthogonal to the other four, facing directly up from the top of the robot. Once a reflected signal is received by a photodiode 546, the receiver 528 determines the frequency of modulation of the signal, the identity sequence, if any, and the envelope of received energy (i.e., the demodulation of energy). These values can be sent to the microprocessor 562, which can calculate the location of the autonomous vehicle relative to the signals and the identities of the signals. Additionally, if only a single point is detected by the receiver 528 (if for example, the robot's view of the second signal is obstructed), the autonomous vehicle can use this point as a heading. By following this heading, the autonomous vehicle can move within the work area until a second point is detected.

In operation, a receiver (e.g., an infrared receiver) can first measure the "noise floor" of the autonomous vehicle's environment, comprising the amount of energy (e.g., infrared energy) present in the autonomous vehicle's environment, which it sets as the threshold value. This value can represent an average of the values for each photodiode. Any subsequent measurement above this threshold value can trigger an event (e.g., a calculation of point azimuth and elevation). The receiver can then measure the modulation frequency again, searching for an expected increase at 10 kHz (i.e., the frequency of the initial synchronization signal transmitted by the transmitter). If a 10 kHz frequency increase is detected, the autonomous vehicle recognizes the increase as an emitted navigation signal. The autonomous vehicle can then measure the amplitude of the reflected point on all five photodiodes to determine an average value. This value can then be compared to a list of signal frequencies to determine which of the signals has been detected. Alternatively, any detected identity sequence associated with the signal can be compared to a list of transmitter codes or signal IDs stored in a lookup table in the autonomous vehicle's processor memory.

The on-board microprocessor can use the amplitude value to determine the azimuth and elevation of the received signals, which it can then use to determine its location within a working area. To determine the azimuth, the microprocessor enters the values of the two strongest readings from the four side photodiodes into an algorithm. The algorithm takes the ratio of these two readings to determine the azimuth angle. For example, if the two strongest readings from two photodiodes are equal, the algorithm recognizes that the point is located at an azimuth angle that is directly between the two photodiodes (i.e., at 45°). In a similar algorithm, the amplitude value measured from the strongest side photodiode and the amplitude value measured from the top-facing photodiode value are used to determine the elevation of the signal. These values can be stored in the autonomous vehicle's memory for future reference.

After the receiver has detected at least two points, and determines the azimuth and elevation of each point, it determines its location within the working space. A triangulation algorithm based on the known ceiling height and the azimuth and elevation of the two detected points allows the processor to determine where in the working space the autonomous vehicle is located. Over time, the values of elevation and azimuth between each coded point and specific locations of the autonomous vehicle within the workspace can be stored in the autonomous vehicle's memory, creating a map of the environment in which the autonomous vehicle operates.

Figure 5B:
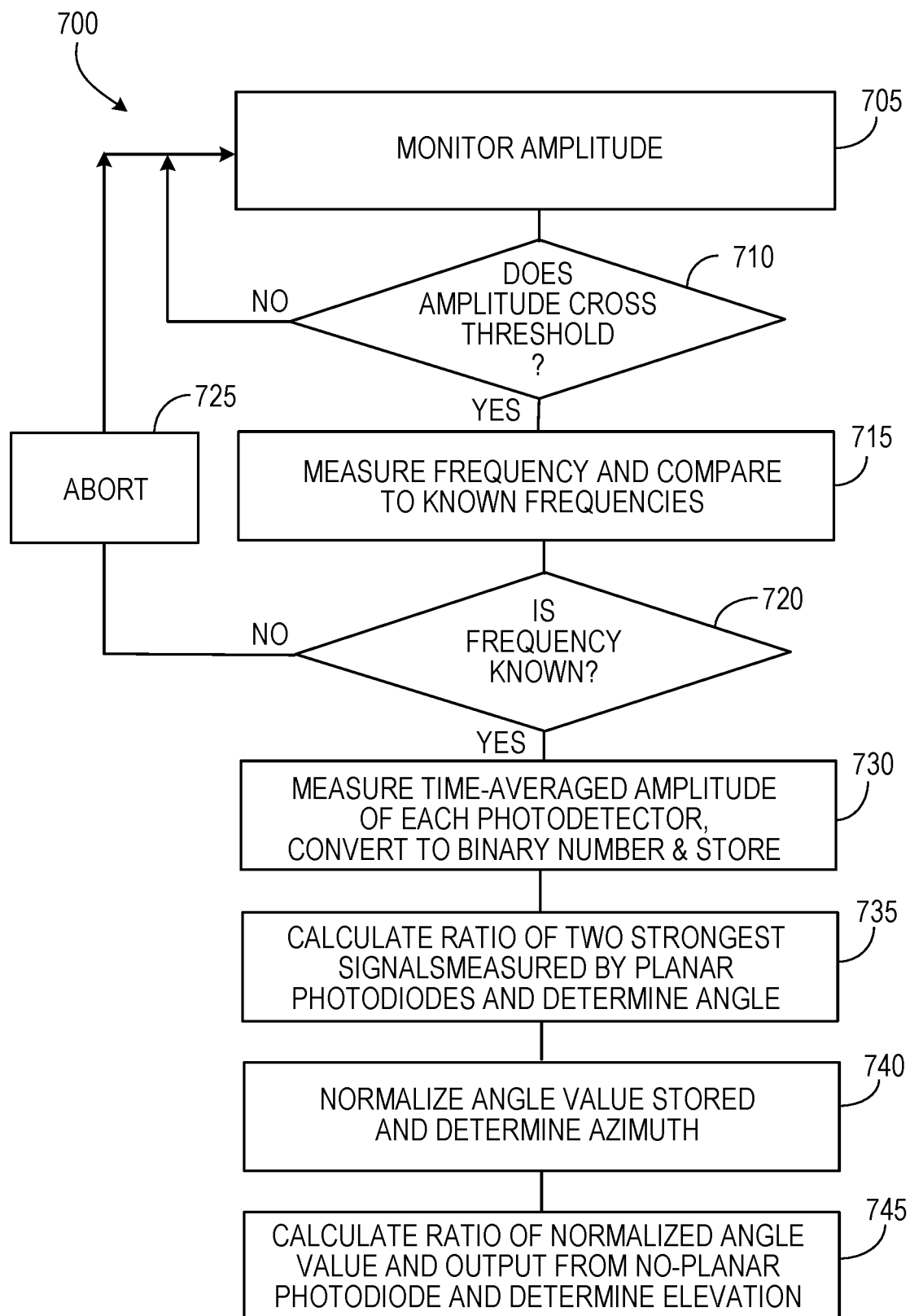
FIG. 5B is a flowchart of a signal detection and localization program in accordance with an exemplary embodiment of the present teachings.

In various embodiments, a navigation system 200 as depicted in FIG. 5B uses an angle-based localization system. Values corresponding to elevation and azimuth are determined by synchronously comparing average amplitudes from the number of detectors arranged on the robot. Of the five detectors, four are arranged in a plane and are angularly spaced by 90° increments. The fifth detector is in the center of the aforementioned four-detector array and aimed so that it is orthogonal to the plane in which the other detectors lie, directed vertically from the autonomous vehicle. Together, this five-element array can have a full or near-full hemispherical field of view.

In the embodiment depicted in FIG. 5B, all five detectors monitor for amplitude (Step 705) until an amplitude that crosses a preset threshold is detected (Step 710). After the amplitude on any detector crosses the preset detection threshold, the frequency of the signal on the strongest detector is measured and compared against known transmit frequencies (Step 715). If the measured frequency is one of the known transmit frequencies (Step 720), the next step in the detection process can be executed. If the signal is not a known transmit frequency, the detection process can be aborted (Step 725) and the signal detected can be declared to be "out of band." Once an "in band" frequency is detected, a time-averaged amplitude for each photo detector can be measured, converted to a binary number, and stored for later processing in a microprocessor memory (Step 730). Upon storing the five numerical values (one for each photodiode), the azimuth angle can be determined.

Of the four detectors that reside in a single plane, the values of the two strongest signals detected are used to form a ratio to determine the azimuth angle (Step 735). The ratio of second-strongest signal over the strongest signal is either compared to a look-up table or inserted into a mathematical equation to determine an azimuth angle output. Both the look-up table and the equation represent the overlap of the received sensitivity patterns of two orthogonal detectors with known sensor responses. In this embodiment, the photo detector output is modeled as a fourth-order Gaussian response to angle off of "boresight," a term that generally refers to a vector that is orthogonal to the semiconductor die in the detector package.

To calculate elevation, the strongest signal from azimuth calculation (i.e., the denominator of the ratio) must first be normalized, as if it were on boresight of the respective detector (Step 740). For example, if the azimuth has been determined to be 10° off of boresight from a given detector, that 100 angle is entered into a look-up table or equation that describes the sensor response of any single photo detector. At zero degrees, the output of this look-up table/equation would be 1.00000. As the angle deviates from zero degrees, the output drops to some fraction of 1.00000 (the normalized value at boresight). For example, if a value of 10° is entered into the equation, the output of this operation can be, for example. 0.99000. The denominator of the azimuth ratio can then be divided by this fractional value in order to scale up, or "normalize" that value to what it would be if the azimuth were actually zero degrees. This normalized value can then be stored in memory and elevation can be determined therefrom.

To calculate elevation, the normalized output from the previous step is used to produce a new ratio with the output from the upward-looking (fifth) detector-, so that the numerator is the second-strongest of the two values and the denominator is the strongest of the two values (Step 745). This ratio is then entered into the same look-up table or equation from the step above (used to calculate azimuth), thus outputting an elevation angle.

The benefits of this type of navigation system can be numerous. As the autonomous vehicle moves about a working area, measuring the azimuth and elevation of the various points detected, it can create a map of the area, thus determining its location within a given space. With this information, it can fuse data from all of its on-board sensors and improve cleaning or other task efficiency. One way it can do this is to create a map where the high-traffic areas in a house or other building are located (as indicated by readings from the dirt sensor, for example). The autonomous vehicle would then clean the areas it identified as high traffic (and therefore, often dirty) each time it passes over that area, whether directed to or not. The autonomous vehicle may also improve its cleaning function by merging the output from the wheel drop, stasis, bumper, and wall-following sensors to roughly mark areas of entrapment, or where large obstacles exist, so that those areas can potentially be avoided in future runs.

In accordance with various embodiments of the present teachings, another method of improving cleaning efficiency involves selectively programming the autonomous vehicle to clean particular areas, as detailed below. For example, a personal computer or remote control may be used to control the autonomous vehicle. Although the autonomous vehicle can operate without operator intervention, an operator can initially set up the autonomous vehicle, or can direct the autonomous vehicle to operate in particular areas or at particular times. For example, by using more then one transmitter in various rooms on one floor of a house, an operator may be able to direct the autonomous vehicle to clean specific rooms in a particular order and/or at a specific time. The operator could select, in a control program field of a computer program for example, the living room, family room, bathroom, and kitchen areas for cleaning. A remote control for use in accordance with the present teachings is described in more detail with respect to FIGS. 19-22.

Once commanded (either immediately or on a predefined schedule), the autonomous vehicle can be signaled to begin its cleaning cycle. The autonomous vehicle undocks from its base/charging station and begins cleaning the closest or first room on the programmed list. It can recognize this room and can differentiate it by the coded group of infrared points (e.g., on a ceiling of the room) or the coded signal emitted in the room. After the first room is cleaned, the autonomous vehicle can, for example, check its level of power and return to its charger for additional charging if needed. In accordance with certain embodiments, in order to return to the charger, the autonomous vehicle can follow the point or points on the ceiling back to the base station. Alternatively, the autonomous vehicle can use a known docking behavior. After charging is complete, the autonomous vehicle can traverse roughly back to the place it left off and resume cleaning. This sequence of events continues until all of the programmed rooms have been cleaned. Alternatively, the selection of particular areas to clean could be, for example, made by remote control or by pressing buttons on a control panel located on the base station. By using a personal computer, however, multiple transmitters could communicate with each other and with the base station via power lines using a known communication technology.

Figure 6:
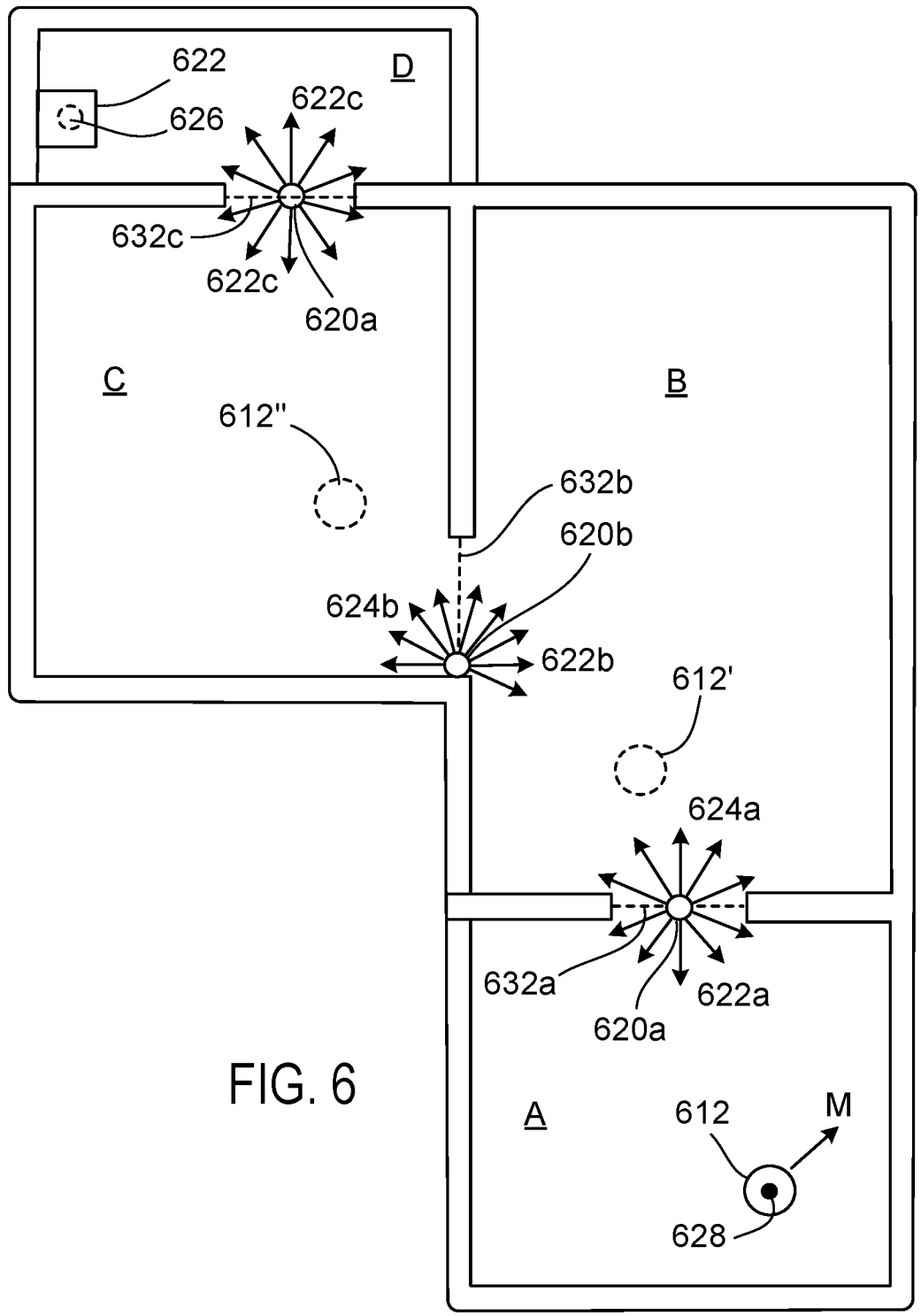
FIG. 6 is a top view of a navigation system for an autonomous vehicle in accordance with another exemplary embodiment of the present teachings.

An alternative embodiment of the present teachings is depicted in FIG. 6, wherein an autonomous vehicle uses a number of signals for headings to move from room to room. The autonomous vehicle 612 is moving in a direction M within room A when its power level drops below a predetermined level, requiring its return to a base charging station 622. Upon crossing the predetermined power level, the autonomous vehicle's receiver 628 searches for a signal from a nearby emitter. As the vehicle is located in room A, it detects the signal 622a emitted from transmitter 620a and, using the signal 622a as a heading, moves directly for that signal 622a.

Alternatively, the autonomous vehicle 612 can emit its own coded pulse, to determine if any transmitters are in the area. This coded pulse could "awaken" sleeping or otherwise dormant transmitters, which would then begin their own emission cycle. Alternatively, the pulse can be an audible or visual signal such as a distinct beep, buzz, or visual strobe. Some pulses need not be within the field of view of the transmitter.

The robot 612 will continue to move toward signal 622a until one of several events happens at or near doorway 632a. In a first event, the autonomous vehicle may determine, based on readings from its photodiodes, that it is directly under the transmitter 620a. In a second event, the autonomous vehicle 612 may sense a second signal 624a, which may overlap the first detected signal 622a. This could occur if the configuration of the emitters, collimators, etc., as described in more detail above, provides overlapping signal patterns between signals 622a and 624a. In a third event, autonomous vehicle 612 can sense a signal from an entirely different transmitter, in this case signal 622b from transmitter 620b. Other events are also contemplated, as suitable for a particular application. The occurrence of an event presents the autonomous vehicle 612 with any number of behavioral, functional, or other options. For example, each coded signal may serve as a unique marker for a different working space. Upon detecting the unique marker associated with a particular working space, the autonomous vehicle may alter its cleaning function. Thus, if room A is carpeted but room B is uncarpeted, the autonomous vehicle can adjust its cleaning as it moves from room A to room B. Upon detecting a second signal (in this case, signal 622b) the autonomous vehicle can, in certain embodiments, completely disregard the first signal 622a received when its return to the base station 622 began. Using new signal 622b as a heading, it begins moving toward that signal 622b. The autonomous vehicle 612 can, in certain embodiments, check its battery level at each event, storing that value in its microprocessor. Over time, the autonomous vehicle can thereby create a table of battery levels at each event (and battery level change from event to event), and be able to accurately determine precise battery power remaining at each transmitter location.

Once the autonomous vehicle is traversing room B (shown in phantom as 617), it will eventually determine, based on battery level, time, or other factors, to follow the heading provided by signal 622b, and continue its return to its base station 622. The autonomous vehicle 612 can follow the heading until an event occurs at or near doorway 632b. Again, the event can be detecting a strength of signal 622b, indicating that the autonomous vehicle is directly below the transmitter, detecting an overlap signal from 624b, or detecting a new signal 622c. The autonomous vehicle 612 can again perform any of the behaviors described above: check and store its battery level; change cleaning characteristics; etc.

Once in room C, the autonomous vehicle can begin following the heading provided by signal 622c. At or near the doorway 632c to room D, an event may direct the autonomous vehicle to perform any number of behaviors. Alternatively, the autonomous vehicle can move directly to charging station 622, guided by emitted signal 626 or another signal or program.

During its return to the base station, as the autonomous vehicle 612 moves from room A to room B to room C and so on, it detects and stores information about each coded signal that it detects along its route. By storing this information, the autonomous vehicle can create a map, using the coded signals as guideposts, allowing it to return to its starting location in the future. After charging, the autonomous vehicle can return to the room it was working in prior to returning to its base by comparing the detected signals and their strengths to the stored information.

Figure 7:
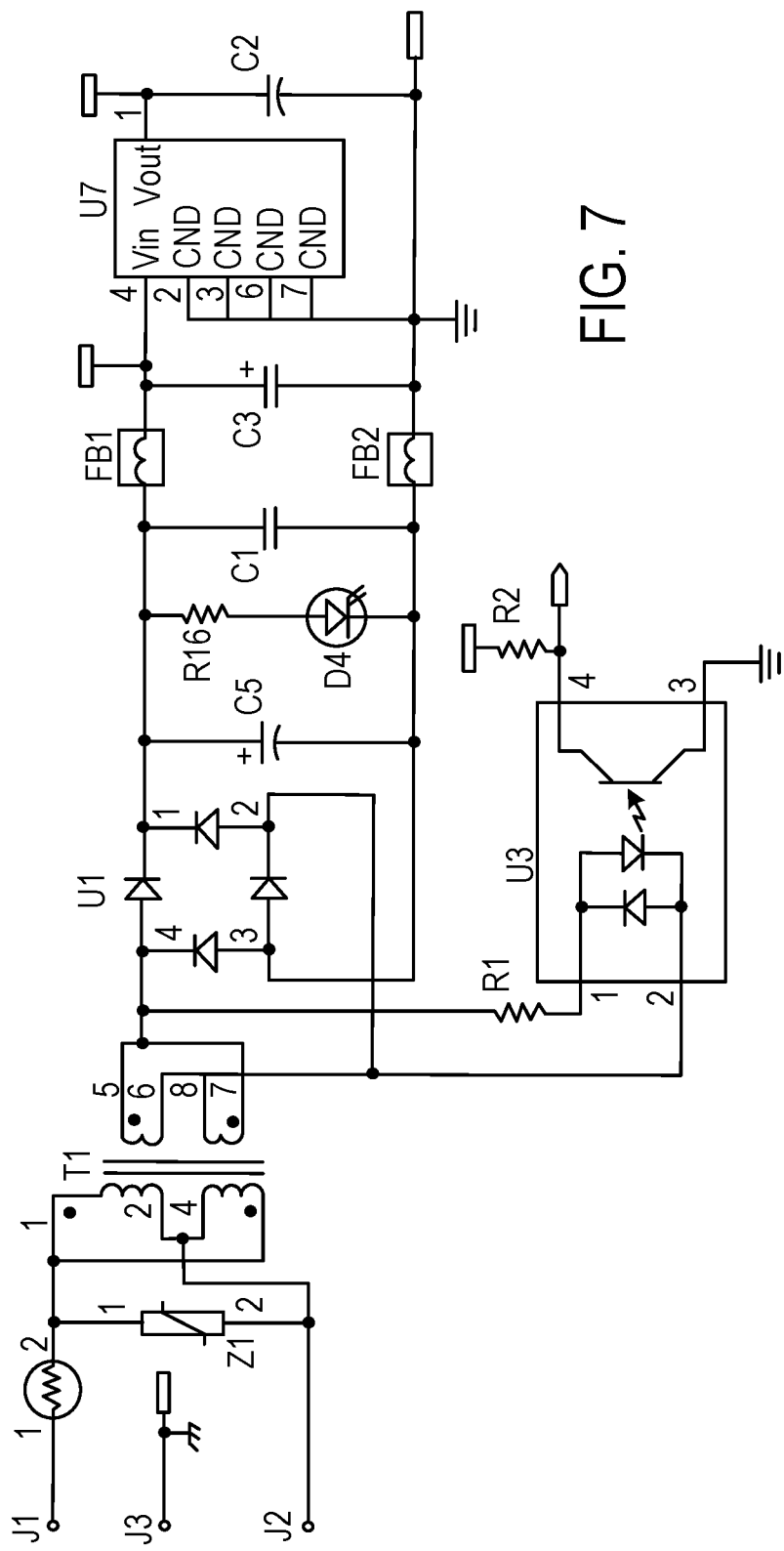
Figure 8:
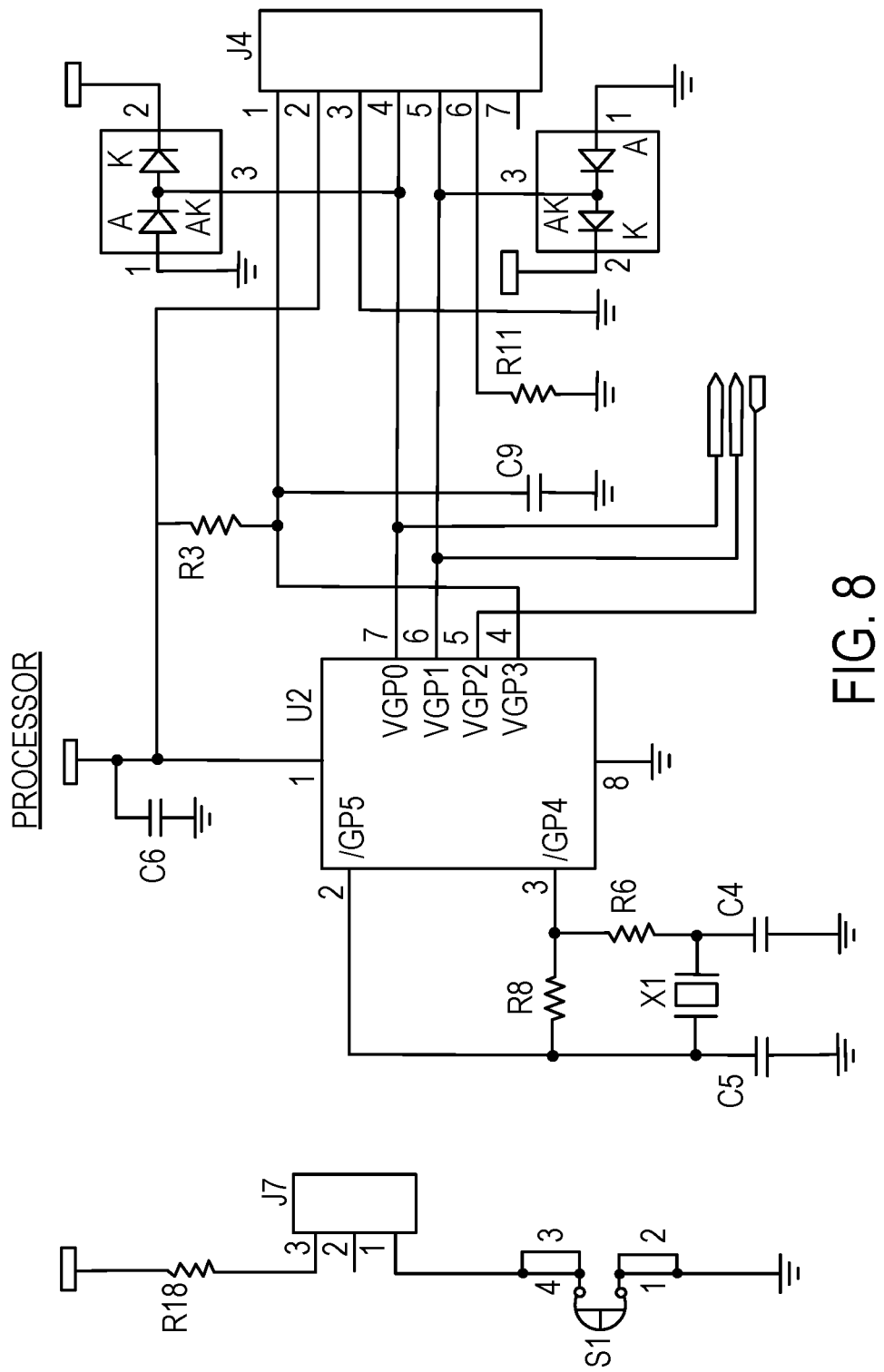
Figure 9:
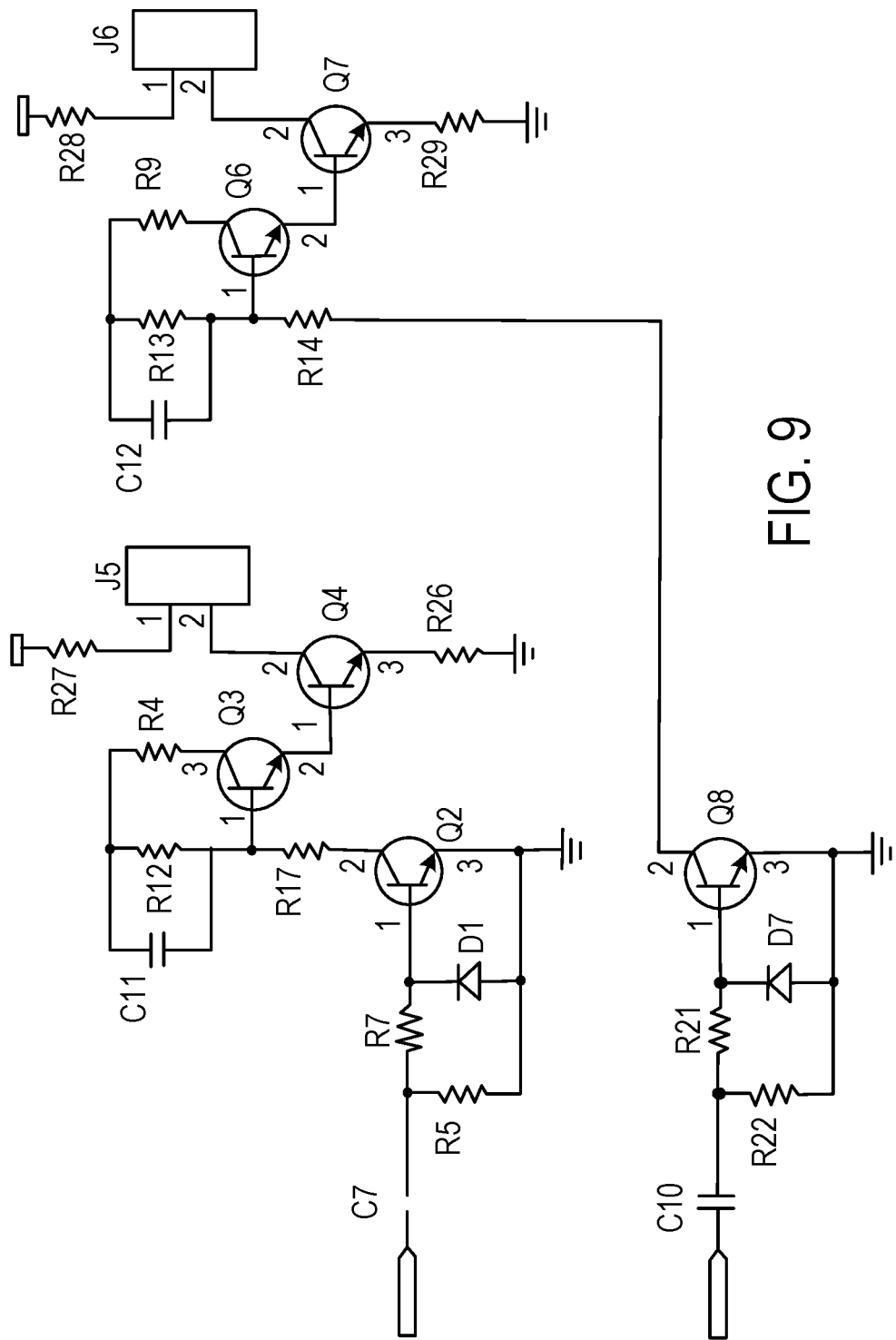

FIGS. 7-9 depict schematic circuit representations for exemplary embodiments of various components of an infrared signal transmitter, namely an AC-DC converter, a microcontroller and support circuitry, and LED drivers. More specifically, FIG. 7 illustrates an electronic circuit that takes 120 VAC 160 Hz line voltage and converts it to a regulated +5 VDC supply. This supply can be used to power the microcontroller and associated circuitry of the transmitter depicted in FIG. 8. In addition to power conversion, this circuit can also provide an isolated digital logic signal to the microcontroller, whenever a "zero-crossing" in the AC line input is detected.

FIG. 8 illustrates a transmitter microcontroller and support circuitry (I.e., a clock oscillator and an in-circuit serial programming port). In addition, there is a circuit that allows a user-initiated button press to project visible light from a pair of LEDs, co-located with a pair of IR LEDs, onto a remote surface for the purpose of assisting the user in aiming the infrared signal points.

FIG. 9 illustrates two channels of an IR LED driver. Each driver can control a preset constant current into a single IR LED, which can then emit near-infrared light that can be collimated by an external lens and projected onto the remote surface. Each IR LED can be modulated and pulse-coded independently of the other. This allows the microcontroller in the autonomous vehicle to discern between the different transmitter signals, to determine which detected signal is which.

Figure 10:
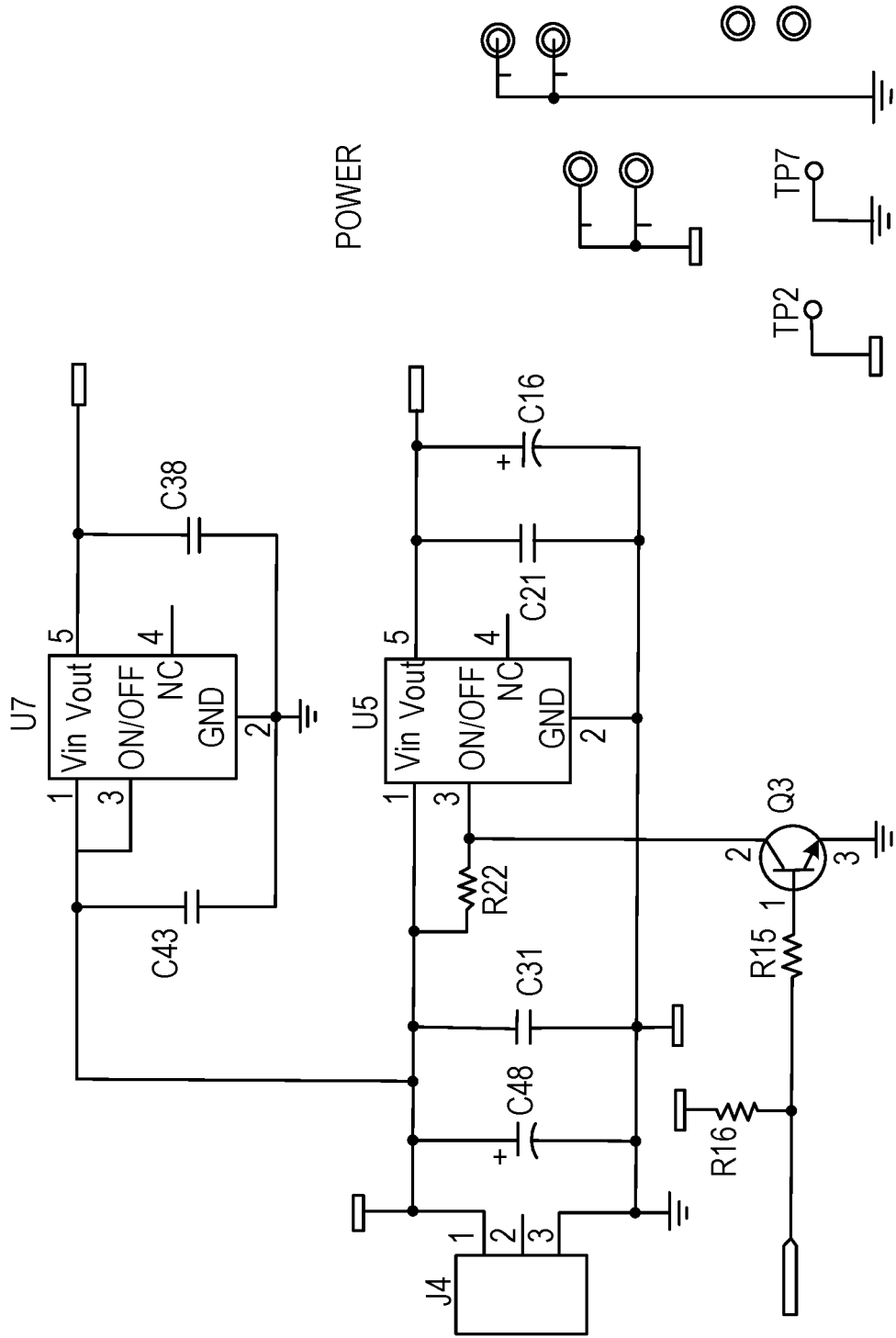

FIGS. 10-14 depict schematic circuit representations in accordance with certain embodiments of various components of a vehicle-mounted infrared receiver, namely DC-DC linear power converters, a five channel preamplifier, a multiplexer and programmable tuned amplifier, detectors, and a microcontroller and associated peripherals. More specifically, FIG. 10 depicts two independent linear voltage regulators. One of the regulation circuits can be switched ON-OFF via a microcontroller to conserve battery power during a sleep mode.

Figure 11A:
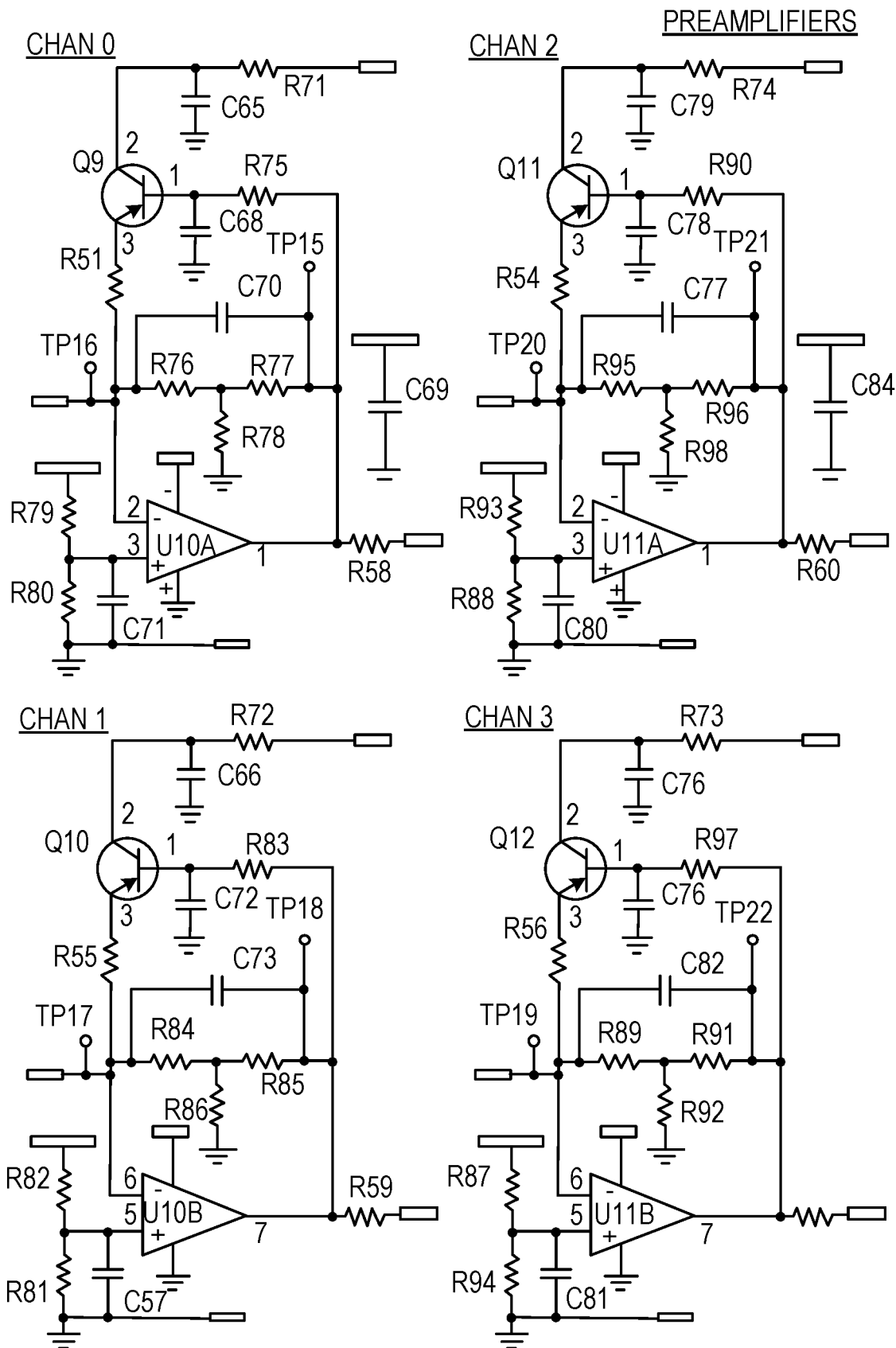

FIG. 11 depicts five independent preamplifiers that can convert respective photodiode output currents into voltages of much larger magnitudes. Each preamplifier is built using an operational amplifier in a transimpedance topology. This allows the preamplifiers to be configured with low noise. Also, there is an active feedback circuit that is used to null large photodiode current offsets caused by exposure of the circuit to sunlight and other strong low-frequency light sources.

Figure 12:
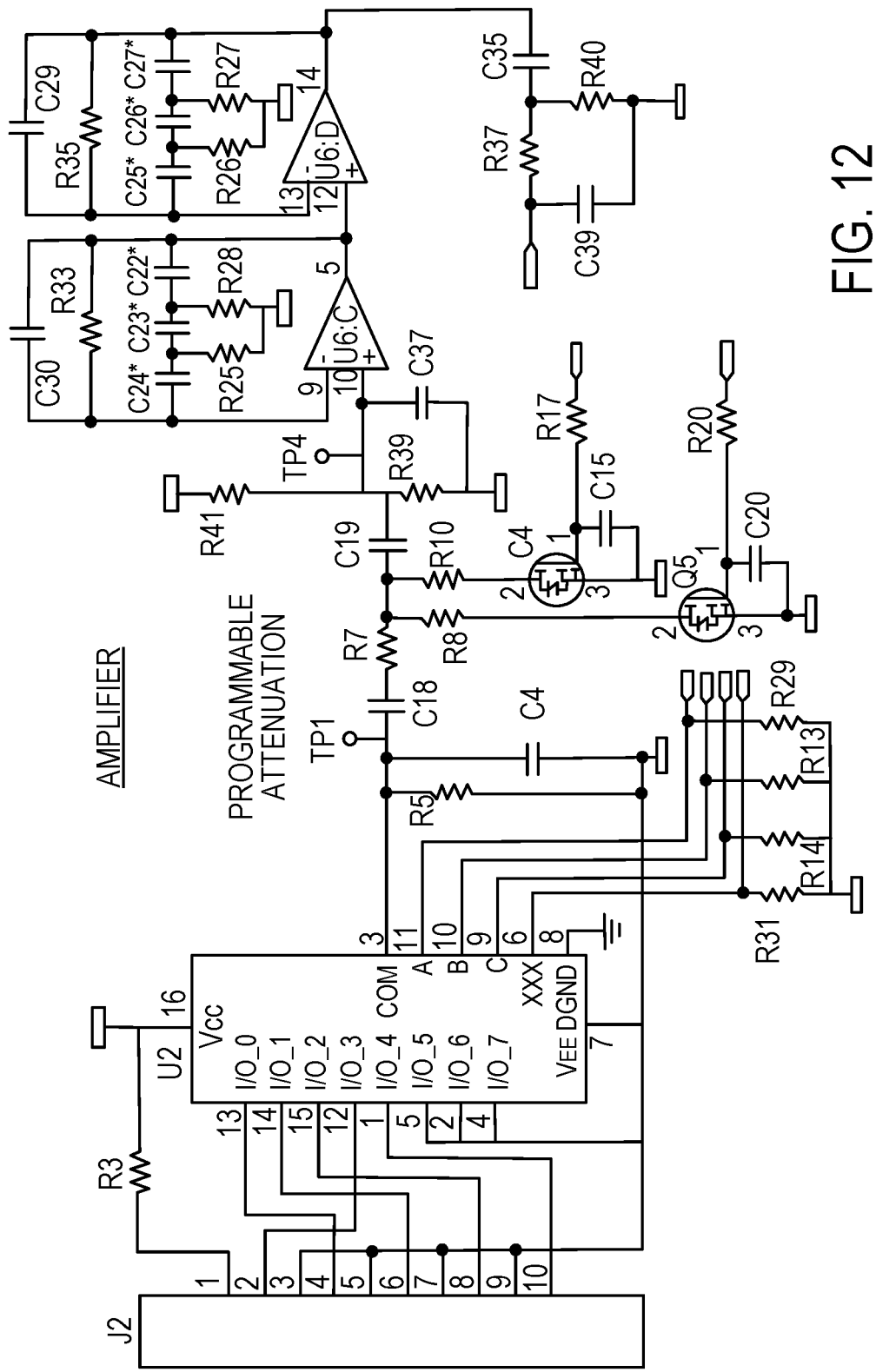

FIG. 12 illustrates an exemplary multiplexer and programmable tuned amplifier for the receiver. This circuitry can be segregated into three functional blocks. The first block is a multiplexer that receives signals from the five photodiode preamplifiers and outputs one of the signals to a programmable attenuator, as commanded by the receiver's microcontroller. The second block is a programmable attenuator that can be used to reduce the overall receiver gain, to deal with the large dynamic range of received signals. As depicted herein, there are two digital inputs from the microcontroller, which permits four-discrete gain levels to be selected. The third block is a tuned, band-pass amplifier that can provide the bulk of the voltage amplification to signals that fall within the circuit's pass band.

FIG. 13 depicts an exemplary embodiment of two detectors that can be used in the receiver. The first detector is a rectifying, envelope detector with integral voltage gain, and can be used to strip modulation frequency and provide a signal envelope to the microcontroller's analog to-digital converter. The signal envelope can be used the by microcontroller to determine the magnitude of the received signal. The second detector is a voltage comparator, which can be used to "square up" received pulses and convert them to a CMOS logic level, thereby allowing the microcontroller to extract digital data from the received signals.

Figure 14:
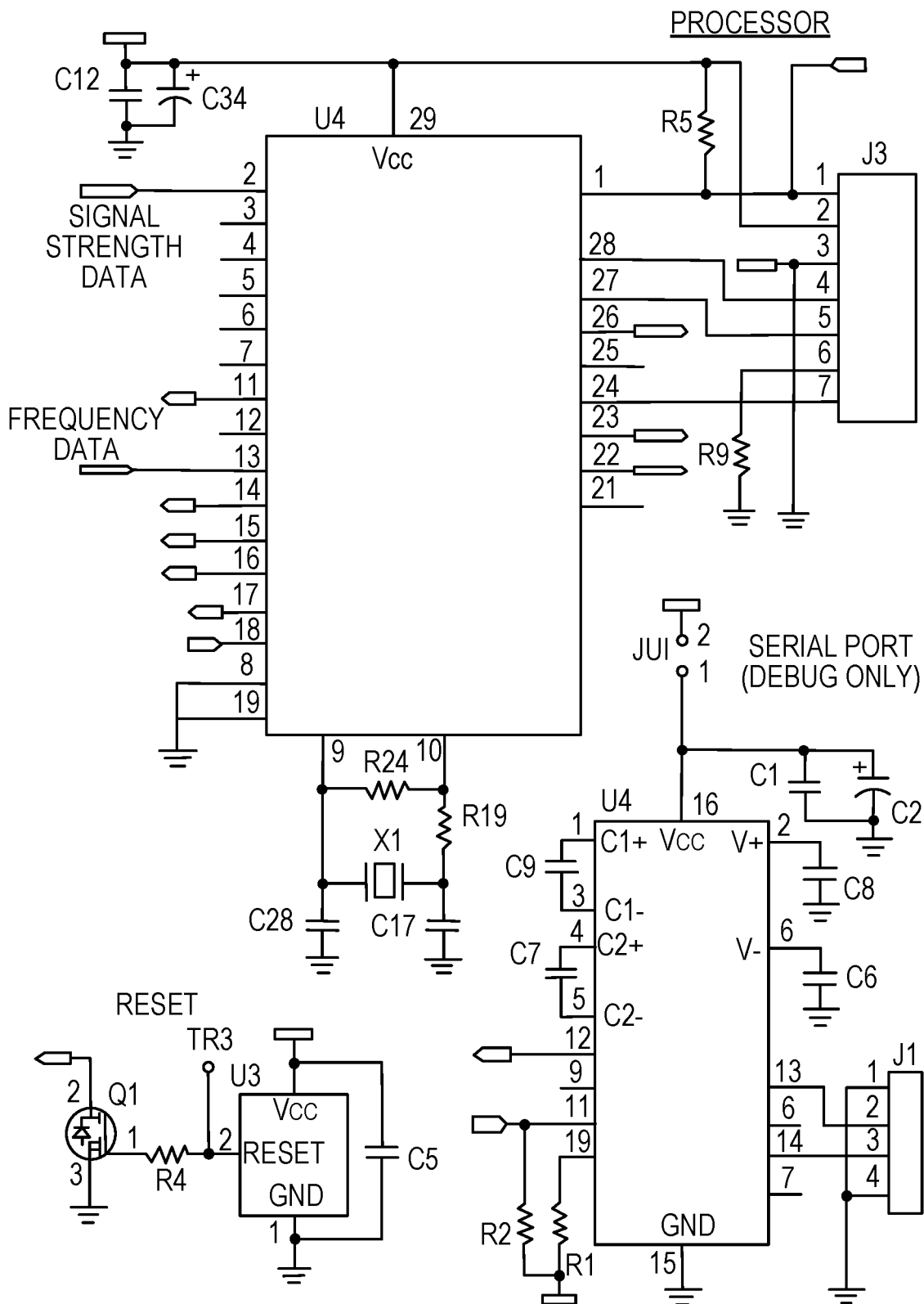

Lastly, FIG. 14 illustrates the microcontroller and its peripherals. The peripherals can include a clock oscillator, ICSP port, voltage supervisor/reset generator, and RS-232 level serial port for interfacing with a host personal computer or a main robot processor.

Accordingly, the navigation system can be operationally robust and adapted to compensate for variances in infrared energy. For example, if the autonomous vehicle is operating in an environment with high base infrared readings (e.g., a space with a large number of fluorescent lighting fixtures or windows that allow entry of sunlight), the autonomous vehicle can distinguish the infrared signals generated by the transmitter from the infrared noise present in the space. Similarly, the receiver can distinguish between other off-band signals, such as infrared remote controls. In such cases, establishing an initial threshold value of infrared energy and emitting a predefined, known, modulated infrared signal from the transmitter overcomes these environmental disturbances. Additionally, the transmitter can be tuned to emit a sufficiently strong infrared signal to accommodate surfaces with varied reflectivity.

FIGS. 15A-15C illustrate side, bottom, and end views, respectively, of an exemplary embodiment of a transmitter 200 having a thin rectangular housing and configured for placement in a variety of locations including a top surface of a doorway as illustrated in FIGS. 2, 6, 17, and 18. In the illustrated embodiment, an emitter 222, 224 is located adjacent each edge $E_L$, $E_R$ of the transmitter 200. In accordance with certain embodiments of the present teachings, each emitter can comprise a lens 222d, 224d as described above to focus and direct the emitted signal. The present teachings also contemplate the transmitter 200 comprising a third emitter 226 with a lens 226*d* to focus and direct the emitted signal. The illustrated transmitter 200 also comprises a battery 230 and a printed circuit board 240. As discussed above, the battery 230 can provide power to the transmitter 200 while allowing the transmitter 200 to be located without regard to proximity of power supplies such as wall outlets. Other portable power sources such as capacitors can also be used instead of, or in addition to, the battery. The printed circuit board 240 can be employed to modulate and code the emitted signals, and to provide power conversion for wirelessly charging the battery 230 or other power source. An antenna 250 can be utilized to intercept fields for conversion to current for wirelessly charging the battery, as described in more detail below.

Figure 23:
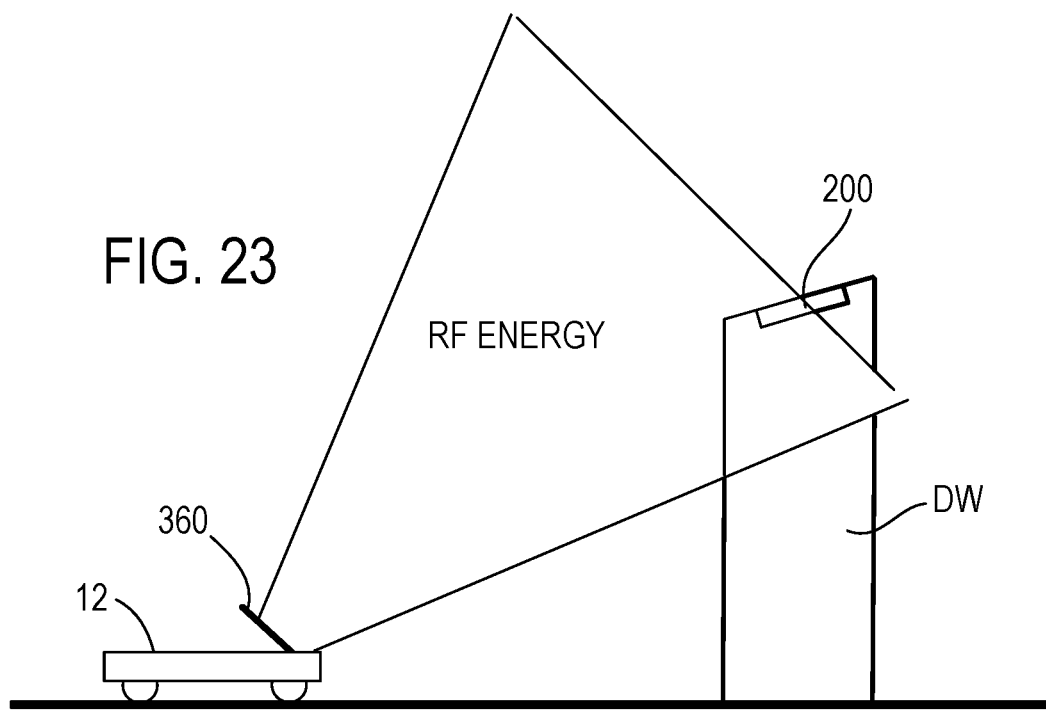
FIG. 23 schematically illustrates an embodiment of a system in accordance with the present teachings.

Wireless charging in accordance with the present teachings can comprise, for example, RF scavenging or magnetoresonance. Wireless charging via RF scavenging can be accomplished as disclosed in U.S. Patent Publication No. 2009/0102296, the entire disclosure of which is incorporated herein by reference. The antenna 250 (e.g., a RF wireless communication antenna) can facilitate both energy harvesting and wireless communication for the transmitter 200 and, to facilitate energy harvesting, can harvest RF energy from a variety of sources including, for instance, medium frequency AM radio broadcast, very high frequency (VHF) FM radio broadcast, cellular base stations, wireless data access points, etc. The energy can be harvested from that naturally available in the environment (work area) or can be broadcast by a source such as an RF signal emitter on the autonomous vehicle or on another device such as a base station or a dedicated emitter. FIG. 23 schematically illustrates an embodiment of the present teachings wherein an autonomous vehicle 12 includes a RF signal emitter 360 that directs an RF signal toward the transmitter 200 for harvesting to ensure adequate RF energy for recharging the battery 230 or other power source. The printed circuit board 240 can serve to convert the harvested RF energy into a usable form, for example AC voltage or DC voltage. The printed circuit board 240 can also regulate the converted power.

Certain embodiments of the present teachings contemplate wireless charging via strongly coupled magnetic resonances, or magnetoresonance. Such wireless charging is described in detail in Kurs, et al., *Wireless Power Transfer via Strongly Coupled Magnetic Resonances*, Science, Vol. 317, pp. 83-86 (Jul. 6, 2008), the entire disclosure of which is incorporated herein by reference. For wireless charging via magnetoresonance, the antenna 250 can comprise, for example, a capture coil that can capture and convert magnetic energy to AC voltage or DC voltage. The magnetic energy captured by the capture coil can be supplied by a power source such as a highly resonant magnetic source. The power source can be located, for example, on the autonomous vehicle (in a scenario such as that illustrated in FIG. 23), on a dedicated device, or on a base station for the autonomous vehicle.

One skilled in the art will appreciate that the transmitter 200 can derive its power from a source other than a battery, for example from a wall plug or by direct connection to a building's power supply. Also, the emitters can have differing locations on the transmitter, and need not be combined with a lens as illustrated. The size of the transmitter can vary in accordance with functional considerations (e.g., being large enough to house its components) as well as aesthetic considerations (e.g., minimizing size to be less obtrusive).

FIGS. 16A-16C illustrate side, bottom, and end views, respectively, of another exemplary embodiment of a transmitter 300 having a thin rectangular housing and configured for placement in a variety of locations including a top surface of a doorway as illustrated in FIGS. 2, 6, 17, and 18. In the illustrated embodiment, an emitter 322, 324 is located adjacent each edge of the transmitter 300. In accordance with certain embodiments of the present teachings, each emitter can comprise a collimator 322*e*, 324*e* and a lens 324*d* (see FIG. 16C) as described above to focus and direct the emitted signal. Although a third emitter is not illustrated in this embodiment, the transmitter can comprise at least one additional emitter and can employ a lens and/or collimator thereon to focus and direct the emitted signal. The illustrated exemplary transmitter 300 also comprises a battery 330 and a printed circuit board 340. As discussed above, the battery 330 can provide power to the transmitter 300 while allowing the transmitter 300 to be located without regard to proximity of power supplies such as wall outlets. The printed circuit board 340 can be employed to modulate and code the emitted signals, and to provide power conversion for wirelessly charging the battery 330 or other power source. An antenna 350 can be utilized to intercept magnetic or RF fields for conversion to current for wirelessly charging the battery 330, as described above with respect to FIG. 15.

One skilled in the art will appreciate that the transmitter 300 can derive its power from a source other than a battery, for example from a wall plug or by direct connection to a building's power supply. Also, the emitters can have differing locations on the transmitter, and need not be combined with a collimator and/or a lens as illustrated. The size of the transmitter can vary in accordance with functional considerations (e.g., being large enough to house its components) as well as aesthetic considerations (e.g., minimizing size to be less obtrusive).

Figure 17:
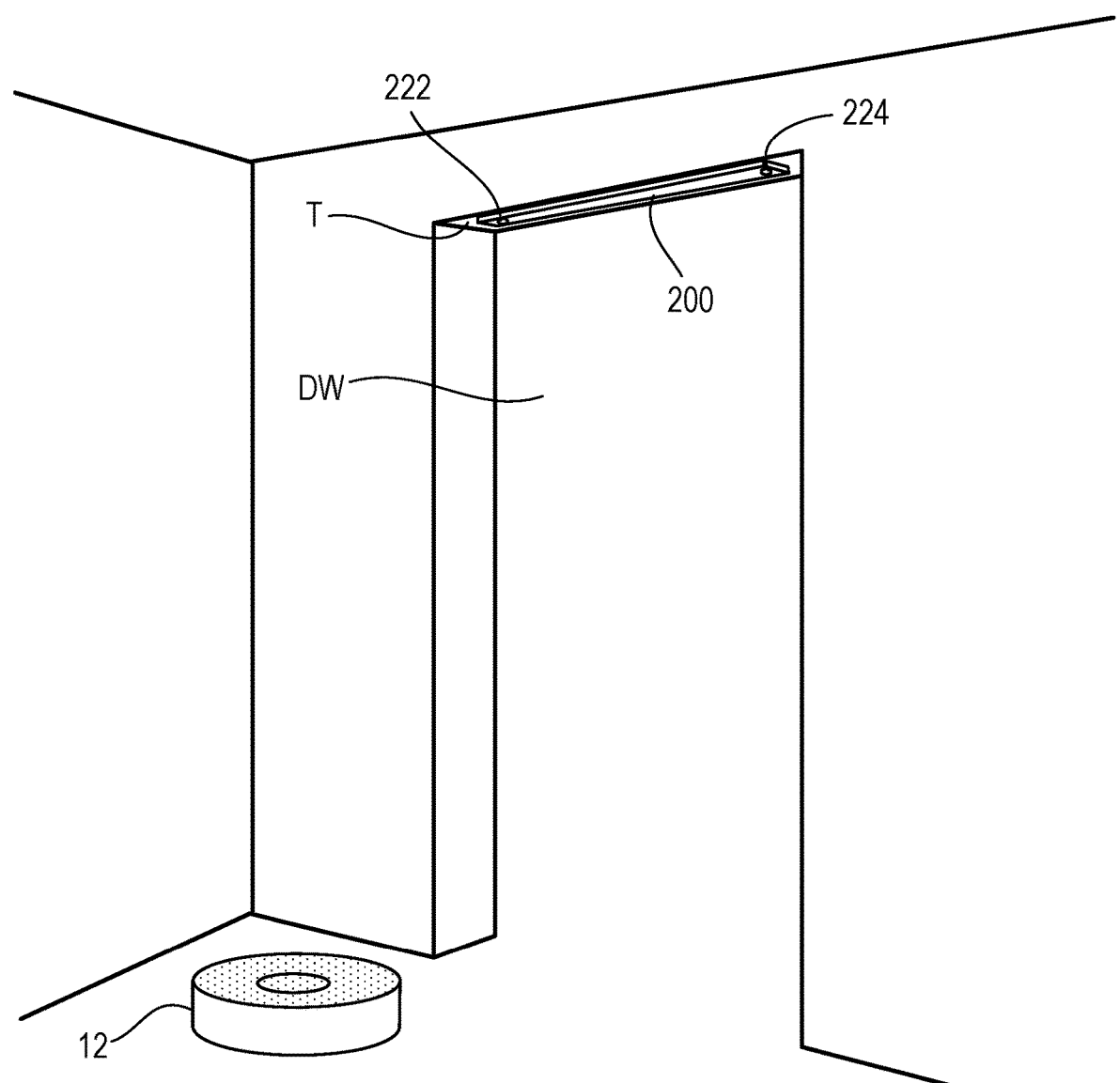
FIG. 17 illustrates the transmitter of FIGS. 15A-15C used in a doorway.

FIG. 17 illustrates a transmitter 200 mounted on a top surface T of a doorway DW or other passage between two areas. In the illustrated embodiment, because the transmitter 200 is placed at a high position within the room or work area, the emitted signals should not be directed upward toward the ceiling and instead should be directed toward the portion of the room through which the autonomous vehicle 12 travels. In accordance with various embodiments, the emitted signals can be coded and modulated as discussed above, so that the autonomous vehicle 12 can recognize the transmitter for localization and/or navigation purposes. In addition, in accordance with certain embodiments, the emitted signals can include information for the autonomous vehicle 12, such as information instructing the autonomous vehicle to adjust its cleaning behavior.

In embodiments of the present teachings employing more than two emitters, the signals can be utilized, e.g., with collimators or lenses, to distinguish different areas within a room. Such a configuration allows the autonomous vehicle 12 to sense its relative location within a room and adjust its cleaning behavior accordingly. For example, a signal could mark an area of the room that an autonomous vehicle would likely get stuck in. The signal could allow an autonomous vehicle to recognize the area and accordingly not enter it, even though it might otherwise be able to do so unimpeded. Alternatively or additionally, different signals could mark areas that require different cleaning behaviors (e.g., due to carpeting or wood floors, high traffic areas, etc.).

The transmitters 200, 300 as illustrated in FIGS. 16A-15C and FIGS. 16A-16C, respectively, can function in a manner similar to transmitter 120 in FIG. 2, as described above, with the additional emitter(s) allowing more functionality, as described above, such as Indicating areas requiring different cleaning behaviors. The transmitters 200, 300 can also function in a manner similar to the transmitters illustrated in FIG. 6, and particularly those located within the doorway/room transitions in FIG. 6.

Figure 18:
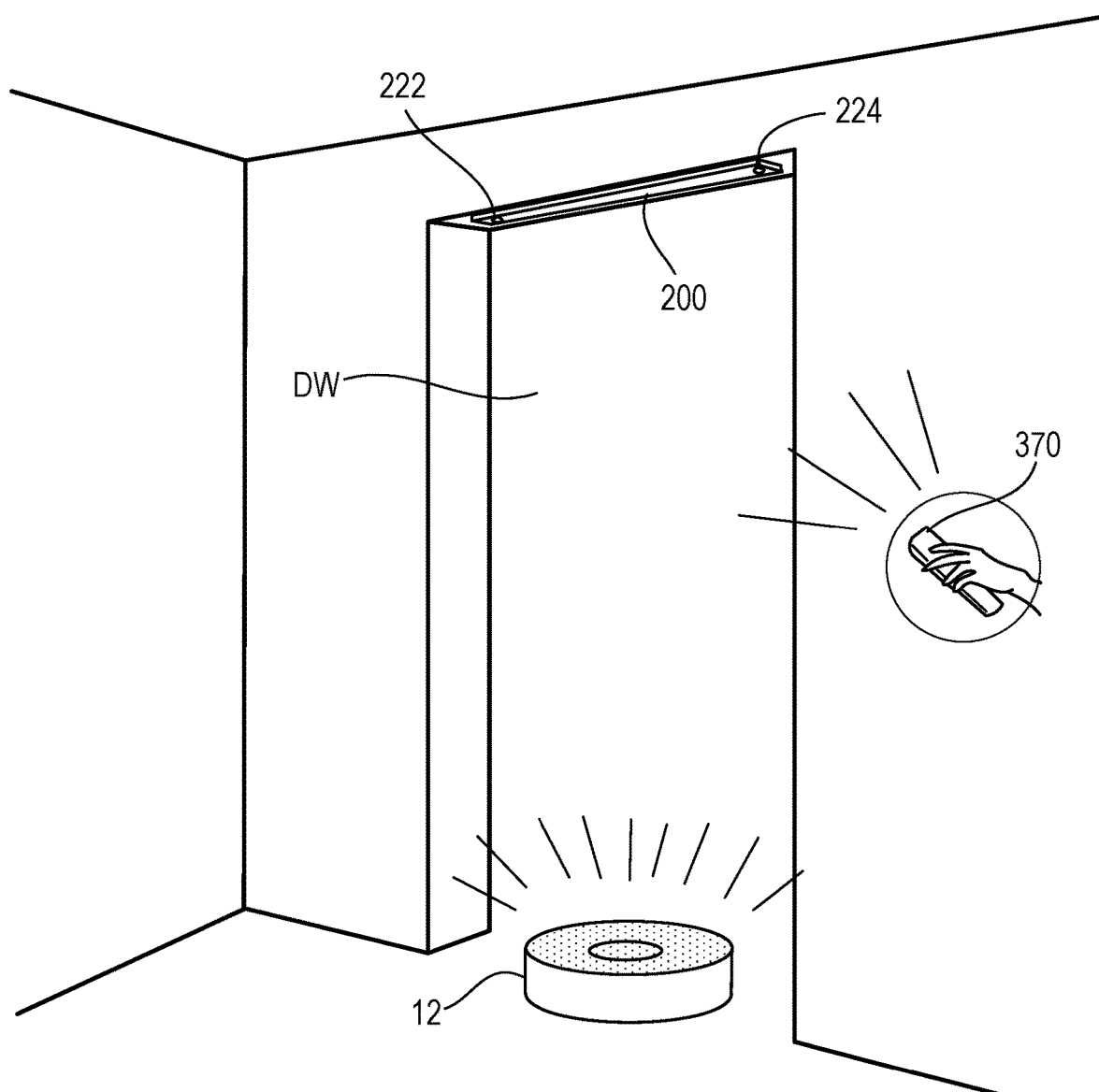
FIG. 18 also illustrates the transmitter of FIGS. 15A-15C used in a doorway.

FIG. 18 illustrates the autonomous vehicle of FIG. 17 passing through a doorway DW, and additionally illustrates an exemplary embodiment of the present teachings utilizing a remote control 370 to communicate with the autonomous vehicle 12 and/or the transmitter 200. An exemplary embodiment of a remote control 370 is disclosed in more detail in FIGS. 19A-22.

Figure 19C:
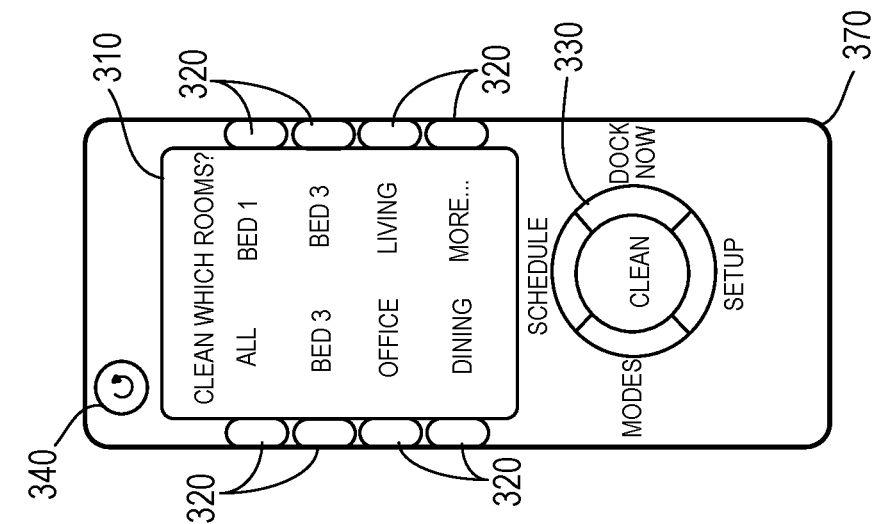
FIGS. 19A-19C illustrate exemplary embodiments of setup screens on an exemplary remote control in accordance with the present teachings.
Figure 19B:
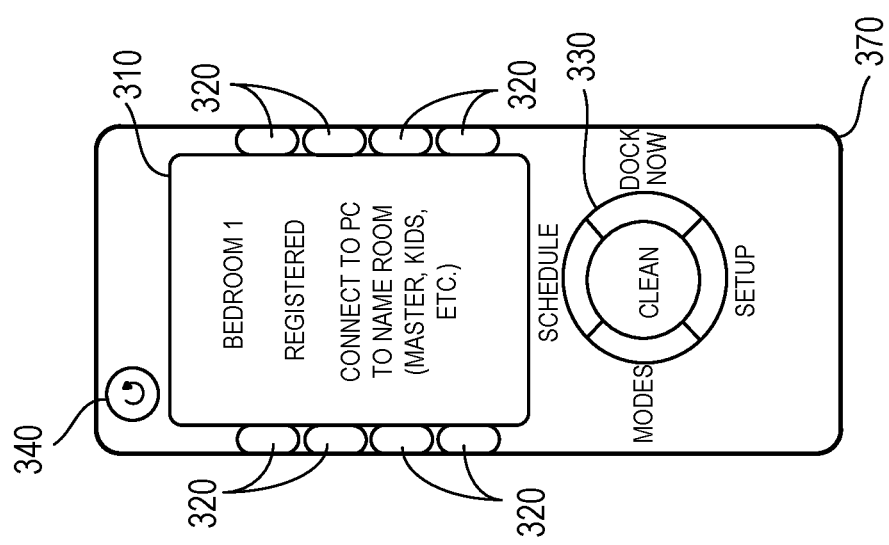
Figure 19A:
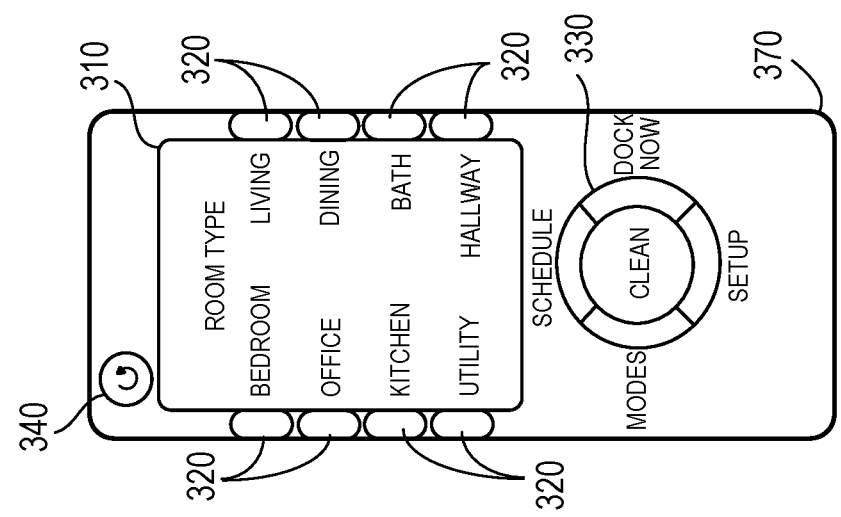

As illustrated in FIGS. 19A-19C, the remote control 370 can include one or more power buttons 340 for powering ON/OFF the remote control 370, the transmitter 200, 300, and/or the autonomous vehicle 12. In addition, the remote control 370 can include a display 310 (e.g., a liquid crystal display) and one or more input devices 320, 330 such as buttons and/or a toggle pad. FIGS. 19A-19C show the remote control 370 being used to set up an autonomous vehicle for cleaning. In FIG. 19A, the display 310 displays a variety of room types to be cleaned by the autonomous vehicle. In the illustrated embodiment, the user can locate himself and the remote control 370 in a work area to be cleaned and select from a number of room type choices, such as bedroom, office, kitchen, utility room, living room, dining room, bathroom, and hallway. The system can identify this room via an encoded and/or modulated emitted signal from a nearby transmitter. The user selects one of the room types by pressing an adjacent button 320. Thereafter, the display 310 can acknowledge the user's selection and automatically connect to a controller (see FIG. 19B), such as a personal computer, to allow the user to provide a specific name for the room. In other embodiments, the remote control can correlate the coded emitted signal with the chosen/assigned name and allow a user to choose whether to engage in specific room naming (e.g., via input 320) or just assign a predetermined name to the room such as bedroom 1, office 1, kitchen 1, etc. Once a room has been assigned an appropriate name, the remote control can allow the user to enter additional names or continue other aspects of setup. In FIG. 19C, the remote control 370 displays the rooms that have been registered and allows the user to select which rooms are to be cleaned. In the illustrated exemplary embodiment, the user can select one or more of the registered rooms by pressing an adjacent button 320. The system can then determine the order of the rooms to be cleaned and the start time (e.g., immediately), or can allow the user to determine the order of the rooms to be cleaned and/or the start time. In certain embodiments, the system can allow the user to select a start time for each selected room.

Figure 20C:
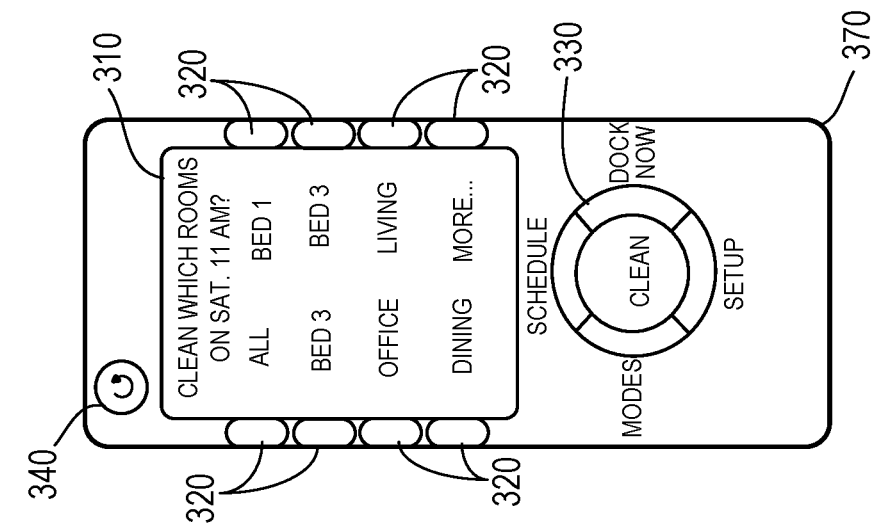
FIGS. 20A-20C illustrate exemplary embodiments of schedule screens on an exemplary remote control in accordance with the present teachings.
Figure 20B:
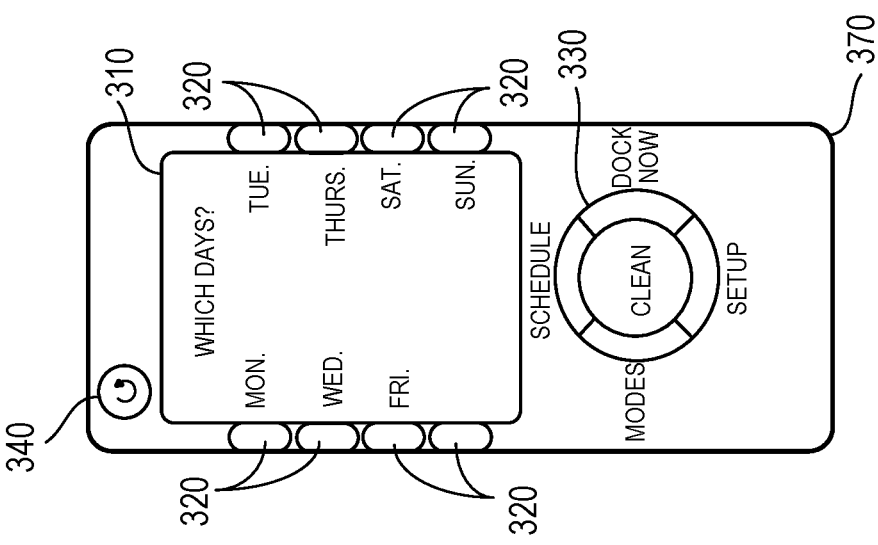
Figure 20A:
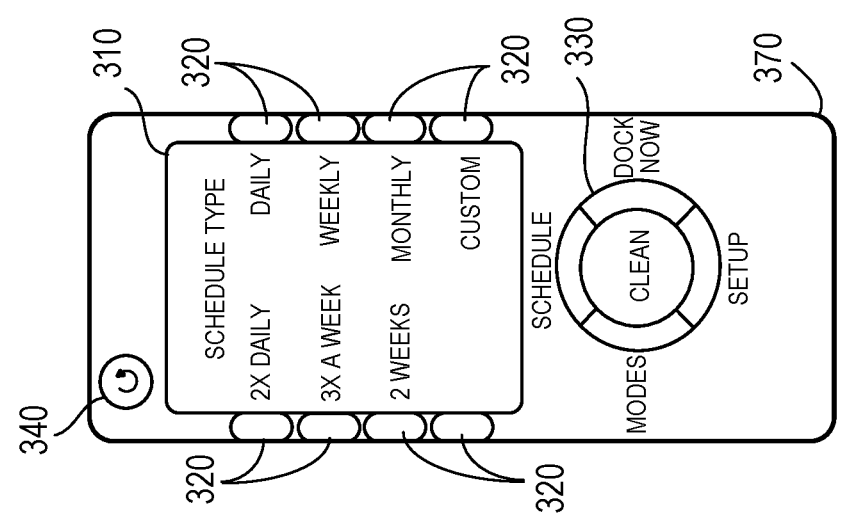

Another input device 330, shown in the illustrated embodiment as a toggle pad or toggle button, can allow the user to direct the autonomous vehicle to perform a number of functions. For example, the user can press a center "CLEAN" portion of the toggle button to direct the autonomous vehicle to begin cleaning immediately, or can select the right "DOCK NOW" button to direct the autonomous vehicle to begin a homing behavior and dock. A top "SCHEDULE" button can be pressed to allow the user to select a schedule of rooms and/or times for cleaning, an exemplary process for which is illustrated in FIGS. 20A-20C. The user can also select the left "MODES" button to select among a variety of available cleaning modes such as spot clean, deep clean, area rug, drive now, etc. as illustrated in FIG. 21A. The modes displayed in FIG. 21A can be selected by pressing a button 320 adjacent a desired mode.

In certain embodiments, after a mode has been selected, the remote control 370 can provide further instructions to the user. For example, if an "area rug" mode has been selected, the remote control 370 can display instructions confirming that the autonomous vehicle is in "area rug" mode and instructing the user to place the autonomous vehicle on the area rug and then press the central "CLEAN" button. In the illustrated embodiment of FIG. 21B, the remote control 370 confirms that the "ROBOT WILL CLEAN THE RUG ONLY." In another example, if a "DRIVE NOW" mode is selected, the remote control 370 can allow the user to drive the vehicle. In accordance with FIG. 21C, the remote control 370 can inform the user that the autonomous vehicle is in a "DRIVE NOW MODE" and instruct the user to press certain buttons to drive the robot. For example, the top "SCHEDULE" button can be pressed to turn the autonomous vehicle forward, the left "MODES" button can be used to turn the vehicle to the left, the right "DOCK NOW" button can be used to move the vehicle to the right, and the bottom "SETUP" button can be used to move the vehicle backward. One skilled in the art will appreciate that other buttons can be used to drive the vehicle, such as a dedicated drive toggle or input buttons 320. In certain embodiments, the remote control 370 can also inform the user how to exit the "DRIVE NOW" mode, such as by pressing a portion of the toggle button 330.

FIGS. 20A-20C illustrate an exemplary embodiment of cleaning schedule displays that can be utilized when the user has pressed the top "SCHEDULE" portion of toggle button 330. In the illustrated exemplary embodiment, cleaning frequency choices are first displayed for user selection. For example, twice daily, daily, three times per week, weekly, bi-weekly, or monthly can be selected. In certain embodiments, a "CUSTOM" selection can also be made. Users select a frequency by pressing a button adjacent their preferred frequency. In accordance with certain embodiments, once a frequency has been selected or, if "CUSTOM" is selected, the remote control can display the days of the week for cleaning (see FIG. 20B). The user can select an appropriate number of desired days by pressing the button 320 adjacent those days. In addition, in accordance with certain embodiments, the user can select a time for cleaning for all selected days or a time for cleaning for each selected day. Thereafter, as illustrated in FIG. 20C, the user can be prompted by the display 310 to select one or more rooms for cleaning at the desired date and time. In accordance with various embodiments of the present teachings, a user could select "CUSTOM" and set a date and time for each room registered in accordance with FIGS. 19A-19C, or could select a predefined schedule as illustrated in FIG. 20A and personalize that selection by choosing days and times if desired.

Figure 22:
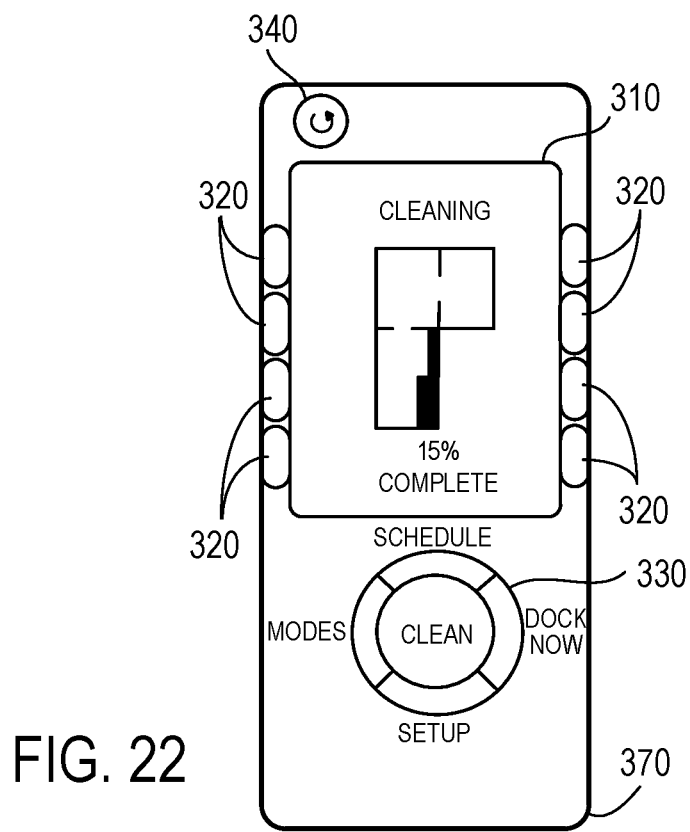
FIG. 22 illustrates exemplary embodiments of a status screen on an exemplary remote control in accordance with the present teachings.

In accordance with certain embodiments of the present teachings, the remote control 370, can also display a status screen such as that illustrated in FIG. 22. The status screen can have a variety of formats for informing the user how much of a scheduled cleaning has been completed. The status screen can be accessed in a variety of ways via manipulation of the remote control 370, or may appear in the manner of a screen saver when the remote control 370 is not being used for controlling an autonomous vehicle or inputting data. One skilled in the art will understand that the selections facilitated by the remote control 370 in FIGS. 19A-22 can also be accomplished via other devices, such as a handheld PDA, a cellular phone, or a laptop or other similar computing devices.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A method comprising:
 receiving, on a mobile device, a user request to register a room of a plurality of selectable rooms in a space, wherein receiving the user request to register the room of the plurality of selectable rooms comprises receiving, on the mobile device, a user selection of a name;
 registering the room of the plurality of selectable rooms, wherein registering the room comprises assigning the name to the room of the plurality of selectable rooms;
 receiving, on the mobile device, a user request to schedule a cleaning task of a robotic vacuum cleaner;
 receiving, on the mobile device, a user input of a user-selected time for initiating the cleaning task of the robotic vacuum cleaner;
 presenting, on the mobile device, display elements associated with the plurality of selectable rooms in the space, wherein presenting the display elements associated with the plurality of selectable rooms in the space comprises presenting, on the mobile device, a display element indicative of the name assigned to the room of the plurality of selectable rooms;
 receiving, on the mobile device, a user input of one or more user-selected rooms selected from the plurality of selectable rooms; and
 sending information to cause the robotic vacuum cleaner to initiate the cleaning task at the user-selected time to clean the one or more user-selected rooms.

2. The method of claim 1, further comprising:
 presenting, on the mobile device, a plurality of predetermined names,
 wherein the user selection of the name corresponds to a user selection of a predetermined name of the plurality of predetermined names.

3. The method of claim 1, wherein:
 the cleaning task is a first cleaning task; and
 presenting the display elements associated with the plurality of selectable rooms in the space further comprises:
  presenting, on the mobile device, a display element associated with a second cleaning task of the robotic vacuum cleaner to clean all of the plurality of selectable rooms in the space.

4. The method of claim 1, wherein:
 sending the information to cause the robotic vacuum cleaner to initiate the cleaning task at the user-selected time to clean the one or more user-selected rooms comprises:
  causing the robotic vacuum cleaner to move about the space as the robotic vacuum cleaner collects sensor data to generate a map of the space and as the robotic vacuum cleaner identifies a location of the robotic vacuum cleaner relative to the map of the space.

5. The method of claim 1, wherein:
 receiving, on the mobile device, the user input of the one or more user-selected rooms selected from the plurality of selectable rooms comprises:
  receiving, on a user input element of the mobile device, the user input of the one or more user-selected rooms selected from the plurality of selectable rooms.

6. The method of claim 1, wherein:
 sending the information to cause the robotic vacuum cleaner to initiate the cleaning task at the user-selected time to clean the one or more user-selected rooms comprises:
  sending a command directly from the mobile device to the robotic vacuum cleaner.

7. The method of claim 1, wherein:
 sending the information to cause the robotic vacuum cleaner to initiate the cleaning task at the user-selected time to clean the one or more user-selected rooms comprises:
  sending information indicative of the user-selected time and the one or more user-selected rooms.

8. A method comprising:
 receiving a user request to register a room of a plurality of selectable rooms in a space, wherein receiving the user request to register the room of the plurality of selectable rooms comprises receiving a user selection of a name;
 registering the room of the plurality of selectable rooms, wherein registering the room of the plurality of selectable rooms comprises assigning the name to the room of the plurality of selectable rooms;
 receiving a user request to schedule a cleaning task of a robotic vacuum cleaner;
 receiving a user input of a user-selected time for initiating the cleaning task of the robotic vacuum cleaner;
 causing a mobile device to present display elements associated with the plurality of selectable rooms in the space, wherein causing the mobile device to present the display elements associated with the plurality of selectable rooms in the space comprises causing the mobile device to present a display element indicative of the name assigned to the room of the plurality of selectable rooms;
 receiving a user input of one or more user-selected rooms selected from the plurality of selectable rooms; and
 sending information to cause the robotic vacuum cleaner to initiate the cleaning task at the user-selected time to clean the one or more user-selected rooms.

9. The method of claim 8, further comprising:
 causing the mobile device to present a plurality of predetermined names,
 wherein the user selection of the name corresponds to a user selection of a predetermined name of the plurality of predetermined names.

10. The method of claim 8, wherein:
 the cleaning task is a first cleaning task; and
 causing the mobile device to present the display elements associated with the plurality of selectable rooms in the space further comprises:
  causing the mobile device to present a display element associated with a second cleaning task of the robotic vacuum cleaner to clean all of the plurality of selectable rooms in the space.

11. The method of claim 8, wherein:
 sending the information to cause the robotic vacuum cleaner to initiate the cleaning task at the user-selected time to clean the one or more user-selected rooms comprises:
  causing the robotic vacuum cleaner to move about the space as the robotic vacuum cleaner collects sensor data to generate a map of the space and as the robotic vacuum cleaner identifies a location of the robotic vacuum cleaner relative to the map of the space.

12. A control device for controlling a robotic vacuum cleaner, the control device comprising:

one or more input devices operable by a user to operate the control device; and a display, wherein the control device is configured to perform operations comprising:

receiving, by the one or more input devices, a user request to register a room of a plurality of selectable rooms in a space, wherein receiving the user request to register the room of the plurality of selectable rooms comprises receiving, by the one or more input devices, a user selection of a name to assign to the room;

receiving, by the one or more input devices, a user request to schedule a cleaning task of the robotic vacuum cleaner;

receiving, by the one or more input devices, a user input of a user-selected time for initiating the cleaning task of the robotic vacuum cleaner;

presenting, on the display, display elements associated with the plurality of selectable rooms in the space, wherein presenting the display elements associated with the plurality of selectable rooms in the space comprises presenting, on the display, a display element indicative of the name assigned to the room of the plurality of selectable rooms;

receiving, by the one or more input devices, a user input of one or more user-selected rooms selected from the plurality of selectable rooms; and sending information to cause the robotic vacuum cleaner to initiate the cleaning task at the user-selected time to clean the one or more user-selected rooms.

13. The control device of claim 12, wherein:

the operations further comprise:

presenting, on the display, a plurality of predetermined names; and the user selection of the name corresponds to a user selection of a predetermined name of the plurality of predetermined names.

14. The control device of claim 12, wherein:

the cleaning task is a first cleaning task; and presenting the display elements associated with the plurality of selectable rooms in the space further comprises:

presenting a display element associated with a second cleaning task of the robotic vacuum cleaner to clean all of the plurality of selectable rooms in the space.

15. The control device of claim 12, wherein:

sending the information to cause the robotic vacuum cleaner to initiate the cleaning task at the user-selected time to clean the one or more user-selected rooms comprises:

causing the robotic vacuum cleaner to move about the space as the robotic vacuum cleaner collects sensor data to generate a map of the space and as the robotic vacuum cleaner identifies a location of the robotic vacuum cleaner relative to the map of the space.

16. A system comprising:

a robotic vacuum cleaner comprising a drive system to maneuver the robotic vacuum cleaner about a space, one or more cleaning elements to clean a surface in the space as the robotic vacuum cleaner is maneuvered about the space, and a processor; and a remote computing system configured to be in communication with the robotic vacuum cleaner, wherein the remote computing system is configured to perform operations comprising:

receiving a user request to register a room of a plurality of selectable rooms in the space, wherein receiving the user request to register the room of the plurality of selectable rooms comprises receiving a user selection of a name;

registering the room of the plurality of selectable rooms, wherein registering the room of the plurality of selectable rooms comprises assigning the name to the room of the plurality of selectable rooms;

receiving a user request to schedule a cleaning task of the robotic vacuum cleaner;

receiving a user input of a user-selected time for initiating the cleaning task of the robotic vacuum cleaner;

causing a display to present display elements associated with the plurality of selectable rooms in the space, wherein causing the display to present the display elements associated with the plurality of selectable rooms in the space comprises causing the display to present a display element indicative of the name assigned to the room of the plurality of selectable rooms;

receiving a user input of one or more user-selected rooms selected from the plurality of selectable rooms; and sending information to cause the robotic vacuum cleaner to initiate the cleaning task at the user-selected time to clean the one or more user-selected rooms; and wherein the robotic vacuum cleaner is configured to initiate the cleaning task to clean the one or more user-selected rooms at the user-selected time in response to sending, by the remote computing system, the information.

17. The system of claim 16, wherein:

the operations of the remote computing system further comprise:

causing the display to present a plurality of predetermined names; and the user selection of the name corresponds to a user selection of a predetermined name of the plurality of predetermined names.

18. The system of claim 16, wherein:

the cleaning task is a first cleaning task; and causing the display to present the display elements associated with the plurality of selectable rooms in the space further comprises:

causing the display to present a display element associated with a second cleaning task of the robotic vacuum cleaner to clean all of the plurality of selectable rooms in the space.

19. The system of claim 16, wherein:

the robotic vacuum cleaner is configured to initiate the cleaning task to clean the one or more user-selected rooms at the user-selected time in response to communicating with the remote computing system by:

undocking from a charging station at the user-selected time and initiating cleaning of the one or more user-selected rooms.

20. The method of claim 1, wherein:

communicating with the robotic vacuum cleaner to cause the robotic vacuum cleaner to initiate the cleaning task at the user-selected time to clean the one or more user-selected rooms comprises:

causing the robotic vacuum cleaner to undock from a charging station at the user-selected time and initiate cleaning of the one or more user-selected rooms.

21. The method of claim 8, wherein:
communicating with the robotic vacuum cleaner to cause the robotic vacuum cleaner to initiate the cleaning task at the user-selected time to clean the one or more user-selected rooms comprises:
   causing the robotic vacuum cleaner to undock from a charging station at the user-selected time and initiate cleaning of the one or more user-selected rooms.

22. The control device of claim 12, wherein:
communicating with the robotic vacuum cleaner to cause the robotic vacuum cleaner to initiate the cleaning task at the user-selected time to clean the one or more user-selected rooms comprises:
   causing the robotic vacuum cleaner to undock from a charging station at the user-selected time and initiate cleaning of the one or more user-selected rooms.

23. The method of claim 1, wherein the name corresponds to a user-entered name.

24. The method of claim 1, wherein the name corresponds to a room type of the room of the plurality of selectable rooms.

25. The method of claim 8, wherein the name corresponds to a user-entered name.

26. The method of claim 8, wherein the name corresponds to a room type of the room of the plurality of selectable rooms.

27. The control device of claim 12, wherein the name corresponds to a user-entered name.

28. The control device of claim 12, wherein the name corresponds to a room type of the room of the plurality of selectable rooms.

29. The system of claim 16, wherein the name corresponds to a user-entered name.

30. The system of claim 16, wherein the name corresponds to a room type of the room of the plurality of selectable rooms.

\* \* \* \* \*